US007062179B2

(12) United States Patent
Ikeno

(10) Patent No.: US 7,062,179 B2
(45) Date of Patent: Jun. 13, 2006

(54) MONITORING APPARATUS, PROCESSING METHOD, PROGRAM FOR IMPLEMENTING THE PROCESSING METHOD, AND MANAGEMENT APPARATUS, MANAGEMENT METHOD, AND PROGRAM FOR IMPLEMENTING THE MANAGEMENT METHOD

(75) Inventor: Hideo Ikeno, Kanagawa (JP)

(73) Assignee: Canon Kabushiki Kaisha (JP)

(*) Notice: Subject to any disclaimer, the term of this patent is extended or adjusted under 35 U.S.C. 154(b) by 184 days.

(21) Appl. No.: 10/755,030

(22) Filed: Jan. 9, 2004

(65) Prior Publication Data

US 2004/0205262 A1 Oct. 14, 2004

(30) Foreign Application Priority Data

Jan. 10, 2003 (JP) ............................. 2003-005154

(51) Int. Cl.
*G03G 15/00* (2006.01)
*G06F 3/00* (2006.01)

(52) U.S. Cl. ............................................ 399/8; 710/15

(58) Field of Classification Search .............. 399/8–13; 710/15; 702/188; 700/19
See application file for complete search history.

(56) References Cited

U.S. PATENT DOCUMENTS 6,366,741 B1 * 4/2002 Fukushima .................... 399/8
2004/0186694 A1 * 9/2004 Oya ............................ 700/19

FOREIGN PATENT DOCUMENTS

JP 2000-13518 A 1/2000
JP 2003162399 A * 6/2003

* cited by examiner

*Primary Examiner*—Arthur T. Grimley
*Assistant Examiner*—Ryan Gleitz
(74) *Attorney, Agent, or Firm*—Rossi, Kimms & McDowell LLP

(57) ABSTRACT

There is provided a monitoring apparatus which is capable of efficiently notifying an external host of completion of installation of the monitoring apparatus for image forming apparatuses, and completion of operations carried out for the image forming apparatuses. The monitoring apparatus is connected to a management apparatus for communication therewith. The monitoring apparatus acquires maintenance information from the image forming apparatuses, and sends the acquired maintenance information to the management apparatus. The monitoring apparatus carries out one of management of completion of installation of the monitoring apparatus and central management of completion of operations carried out for the image forming apparatuses.

10 Claims, 19 Drawing Sheets

MONITORING APPARATUS, PROCESSING METHOD, PROGRAM FOR IMPLEMENTING THE PROCESSING METHOD, AND MANAGEMENT APPARATUS, MANAGEMENT METHOD, AND PROGRAM FOR IMPLEMENTING THE MANAGEMENT METHOD

BACKGROUND OF THE INVENTION

1. Field of the Invention

The present invention relates to a monitoring apparatus, a processing method, and a program for implementing the processing method, as well as to a management apparatus, a management method, and a program for implementing the management method. In particular, the present invention relates to a monitoring apparatus which monitors at least one device (in particular, an office printer such as a multi-function copying machine), collects information on the device, and sends the collected information to a management server (host), a processing method executed by the monitoring apparatus, and a program for implementing the control method, as well as to a management apparatus which manages at least one monitoring apparatus and collects information on the monitoring apparatus, a management method executed by the management apparatus, and a program for implementing the management method.

2. Description of the Related Art

Conventionally, there has been a remote monitoring system which is constructed such that a device such as a copying machine and an apparatus (host) having an information processing function are connected to each other via communication medium so that they can communicate with each other, and which remotely monitors the status of the device via the host. In this type of remote monitoring system, the device directly sends an installation completion report indicating that the device has been completely installed, an operation start report indicating that a service person has started operation such as maintenance, an operation completion report indicating that a service person has completed operation, and so forth to the host (Japanese Laid-Open Patent Publication (Kokai) No. 2000-013518, for example).

The above described conventional remote monitoring system, however, is encountered with problems as below. In sending the above described installation completion report, operation start report, or operation completion report, the device itself should be able to properly communicate with the host. Thus, in the case where settings as to a communicating system of the device are changed, e.g. an IP (Internet Protocol) is changed, the change in settings as to the communicating system for communication with the host is reported after the settings are changed, and hence it is impossible to properly send a report on the change in the settings.

Further, a LAN environment is usually provided as a user environment where image forming apparatuses are installed. In such an environment, connecting a service person's notebook PC to the LAN to communicate with an image forming apparatus is not easy in terms of security because this requires complicated operations such as registration of the notebook PC's MAC address in a communication server.

On the other hand, it may be envisaged that the service person connects a wireless terminal to the LAN in the user environment, but this raises problems such as cost increase and impossibility of communication when reception is poor.

SUMMARY OF THE INVENTION

It is therefore an object of the present invention to provide a monitoring apparatus, a processing method, a program for implementing the processing method, as well as to a management apparatus, a management method, and a program for implementing the management method in a system which makes it possible to efficiently notify an external host (management apparatus) that the installation of a monitoring apparatus that monitors image forming apparatuses has been completed, and operations carried out for the image forming apparatuses via the monitoring apparatus have been completed.

To attain the above object, in a first aspect of the present invention, there is provided a monitoring apparatus capable of acquiring maintenance information from a plurality of image forming apparatuses to be monitored via a communication line, and capable of communicating with a management apparatus, comprising an acquiring device that acquires the maintenance information from the plurality of image forming apparatuses to be monitored, and a management device that carries out one of management of completion of installation of the monitoring apparatus and central management of completion of operations carried out for the plurality of image forming apparatuses to be monitored.

According to the first aspect of the present invention, the monitoring apparatus is capable of acquiring maintenance information from a plurality of image forming apparatuses to be monitored via a communication line, and communicating with a management apparatus. The management device carries out one of management of completion of installation of the monitoring apparatus and central management of completion of operations of the plurality of image forming apparatuses to be monitored. Therefore, it is possible to properly notify the management apparatus that the installation of the monitoring apparatus has been completed and operations carried out for the image forming apparatuses have been completed. As a result, the management apparatus can remotely and centrally manage processing relating to monitoring of devices such as image forming apparatuses to be monitored by the monitoring apparatus, such as acquisition of information from the image forming apparatus.

Preferably, the management device comprises an installation completion report generating device that generates an installation completion report including information specifying the monitoring apparatus when installation of the monitoring apparatus is completed, and the monitoring apparatus further comprises an installation completion report sending device that sends the generated installation completion report to the management apparatus.

Also preferably, the maintenance information acquired from the image forming apparatuses includes information relating to consumable supplies used in the image forming apparatuses, and information relating to failure having occurred in the image forming apparatuses.

Also preferably, the monitoring apparatus comprises a selecting device that selects a predetermined image forming apparatus from among the plurality of image forming apparatuses, an operation start report sending device that sends an operation start report relating to the image forming apparatus selected by the selecting device to the management apparatus, and an operation completion report sending device that sends an operation completion report relating to the image forming apparatus selected by the selecting device to the management apparatus.

More preferably, the monitoring apparatus comprises an operating device that carries out operations for the selected image forming apparatus after the operation start report is sent, and the operation completion report sending device generates the operation completion report including contents of the operations carried out by the operating device, and sends the generated operation completion report to the management apparatus.

Further preferably, the operation completion report sending device generates the operation completion report including information identifying the monitoring apparatus.

Also preferably, the monitoring apparatus further comprises an operation start report generating device operable when operation for an image forming apparatus selected from the plurality of image forming apparatuses to be subjected to operation are started, to generate an operation start report including information specifying the image forming apparatus subjected to the operation and information indicative of operation starting date and time, an operation start report sending device that sends the operation start report to the management apparatus, an operation completion report generating device that generates an operation completion report including information capable of being correlated with the operation start report and information indicative of operation completion date and time, and an operation completion report sending device that sends the operation completion report to the management apparatus.

To attain the above object, in a second aspect of the present invention, there is provided a management apparatus capable of communicating with a monitoring apparatus that is capable of acquiring maintenance information from a plurality of image forming apparatuses to be monitored via a communication line, comprising an installation completion report receiving device that receives an installation completion report including information identifying the monitoring apparatus by electronic mail, and a normal periodic processing device that identifies the monitoring apparatus having been installed according to the received installation completion report, and carries out a normal periodic process for the identified monitoring apparatus.

Preferably, the management apparatus further comprises an operation start report receiving device that receives an operation start report including information identifying an image forming apparatus subjected to operation, and information indicative of operation starting date and time, an operation completion report receiving device that receives an operation completion report including information capable of being correlated with the operation start report and information indicative of operation completion date and time, and an operation time period recognition device that recognizes an operation time period for which operation is carried out for the identified image forming apparatus according to at least one of the operation start report and the operation completion report.

More preferably, the management apparatus further comprises a nullification device operable upon receipt of the operation start report, to nullify a notification of counter information or failure relating to the image forming apparatus subjected to operation, sent from the monitoring apparatus.

Also preferably, the normal periodic process comprises a process in which the monitoring apparatus is periodically requested to send information acquired from the image forming apparatuses to be monitored by the monitoring apparatus.

To attain the above object, in a third aspect of the present invention, there is provided a processing method executed by a monitoring apparatus capable of acquiring maintenance information from a plurality of image forming apparatuses to be monitored via a communication line, and capable of communicating with a management apparatus, comprising an acquiring step of acquiring acquires the maintenance information from the plurality of image forming apparatuses to be monitored, and a management step of carrying out one of management of completion of installation of the monitoring apparatus and central management of completion of operations carried out for the plurality of image forming apparatuses to be monitored.

Preferably, the management step comprises an installation completion report generating step of generating an installation completion report including information specifying the monitoring apparatus when installation of the monitoring apparatus is completed, the processing method further comprises an installation completion report sending step of sending the generated installation completion report to the management apparatus.

Also preferably, the maintenance information acquired from the image forming apparatuses includes information relating to consumable supplies used in the image forming apparatuses, and information relating to failure having occurred in the image forming apparatuses.

Also preferably, the processing method comprises a selecting step of selecting a predetermined image forming apparatus from among the plurality of image forming apparatuses, an operation start report sending step of sending an operation start report relating to the image forming apparatus selected in the selecting step to the management apparatus, and an operation completion report sending step of sending an operation completion report relating to the image forming apparatus selected in the selecting step to the management apparatus.

More preferably, the processing method comprises an operating step of carrying out operations for the selected image forming apparatus after the operation start report is sent, and the operation completion report sending step comprises generating the operation completion report including contents of the operations carried out in the operating step, and sending the generated operation completion report to the management apparatus.

Further preferably, the operation completion report sending step comprises generating the operation completion report including information identifying the monitoring apparatus.

Also preferably, the processing method further comprises an operation start report generating step of generating an operation start report including information specifying an image forming apparatus selected from the plurality of image forming apparatuses to be subjected to operation and information indicative of operation starting date and time, when operation for the image forming apparatus selected to be subjected to operation are started, an operation start report sending step of sending the operation start report to the management apparatus, an operation completion report generating step of generating an operation completion report including information capable of being correlated with the operation start report and information indicative of operation completion date and time, and an operation completion report sending step of sending the operation completion report to the management apparatus.

To attain the above object, in a fourth aspect of the present invention, there is provided a management method executed by a management apparatus capable of communicating with a monitoring apparatus that is capable of acquiring maintenance information from a plurality of image forming apparatuses to be monitored via a communication line, comprising an installation completion report receiving step of receiving an installation completion report including information identifying the monitoring apparatus by electronic mail, and a normal periodic processing step of identifying the monitoring apparatus having been installed according to the received installation completion report, and carrying out a normal periodic process for the identified monitoring apparatus.

Preferably, the management apparatus further comprises an operation start report receiving step of receiving an operation start report including information identifying an image forming apparatus subjected to operation, and information indicative of operation starting date and time, an operation completion report receiving step of receiving an operation completion report including information capable of being correlated with the operation start report and information indicative of operation completion date and time, and an operation time period recognition step of recognizing an operation time period for which operation is carried out for the identified image forming apparatus according to at least one of the operation start report and the operation completion report.

More preferably, the management apparatus further comprises a nullification step of nullifying a notification of counter information or failure relating to the image forming apparatus subjected to operation, sent from the monitoring apparatus upon receipt of the operation start report.

Also preferably, the normal periodic process comprises a process in which the monitoring apparatus is periodically requested to send information acquired from the image forming apparatuses to be monitored by the monitoring apparatus.

To attain the above object, in a fifth aspect of the present invention, there is provided a program for causing a computer to execute a processing method by a monitoring apparatus capable of acquiring maintenance information from a plurality of image forming apparatuses to be monitored via a communication line, and capable of communicating with a management apparatus, comprising an acquiring module for acquiring acquires the maintenance information from the plurality of image forming apparatuses to be monitored, and a management module for carrying out one of management of completion of installation of the monitoring apparatus and central management of completion of operations carried out for the plurality of image forming apparatuses to be monitored.

To attain the above object, in a sixth aspect of the present invention, there is provided a program for causing a computer to execute a processing method by a monitoring apparatus capable of acquiring maintenance information from a plurality of image forming apparatuses to be monitored via a communication line, and capable of communicating with a management apparatus, comprising an installation completion report receiving module for receiving an installation completion report including information identifying the monitoring apparatus by electronic mail, and a normal periodic processing module for identifying the monitoring apparatus having been installed according to the received installation completion report, and carrying out a normal periodic process for the identified monitoring apparatus.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing a preferred embodiment thereof.

Figure 1:
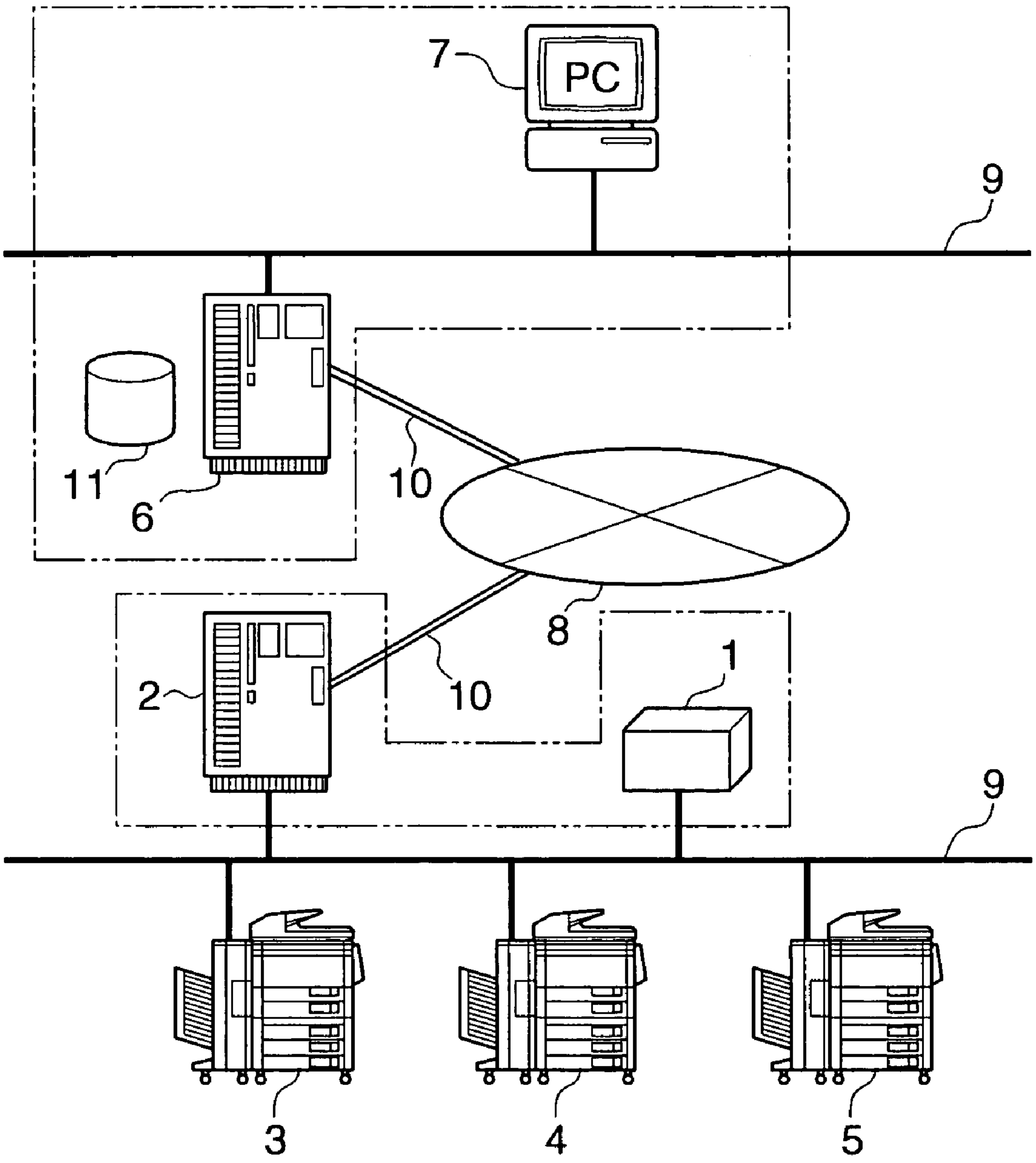
FIG. 1 is a diagram schematically showing an example of the entire construction of a device remote monitoring system including a monitoring apparatus and a management apparatus according to an embodiment of the present invention.

FIG. 1 is a view schematically showing an example of the overall construction of a device remote monitoring system including a monitoring apparatus and a management apparatus according to an embodiment of the present invention. The device remote monitoring system is comprised of a device monitoring apparatus (hereinafter abbreviated as the "monitoring apparatus") 1 as the monitoring apparatus according to the present invention, a terminal side management server 2, devices 3, 4, and 5, which may be each implemented by an image forming apparatus, a center side management server 6 as the management apparatus according to the present invention, a center side client PC 7, a communication line 8, and a LAN (Local Area Network) 9. Reference numeral 10 denotes a communication protocol.

In the device remote monitoring system, the center side management server 6 having at least a construction which a general information processing apparatus has is provided as a center side apparatus which supervises monitoring of the devices 3, 4, and 5. Further, there exist a database 11 for accumulating information, and the center side client PC 7 which is connected to the center side management server 6 via the LAN 9, and is operable independently or as a client of the center side management server 6. The center side management server 6 and the terminal side management server 2 are capable of communicating with each other via the communication line 8 such as the Internet using the predetermined communication protocol 10. In the present embodiment, a general protocol (such as SMTP (Simple Mail Transfer Protocol)) and an authentication function are also provided for preventing unauthorized access to the terminal side management server 2 and the center side management server 6 and getting over (passing through) a firewall provided on the network in the device remote monitoring system. It should be noted that although only one center side management server 6 is provided in the illustrated example, in the present embodiment it is assumed that a plurality of center side management servers 6 can be provided depending on intended purposes such as failure monitoring and counter information collection as described later.

On the other hand, on the terminal side of the device remote monitoring system, the terminal side management server 2 exists, and the monitoring apparatus 1 is connected to the LAN 9, for collecting information from the devices 3, 4, and 5 and personal computers, not shown. The monitoring apparatus 1 has a function of collecting maintenance information including operation information and failure information on the various devices 3, 4, and 5 with which the monitoring apparatus 1 can communicate via the LAN 9, a function of providing control to update control programs and the like for the devices 3, 4, and 5, and a function of transferring the collected information to the center side management server 6 via the terminal side management server 2.

It should be noted that insofar as information can be shared between the monitoring apparatus 1 and the terminal side management server 2, and between the center side client PC 7 and the center side management server 6, these apparatuses may be provided as independent apparatuses as in the present embodiment, or may be provided as single apparatuses having the respective functions of the apparatuses (a single apparatus having the respective functions of the monitoring apparatus 1 and the terminal side management server 2, and a single apparatus having the respective functions of the center side client PC 7 and the center side management server 6). This alternative arrangement is shown by two-dot chain lines in FIG. 1. In the following description, it is assumed that the monitoring apparatus 1 communicates with the external center side management server 6 via the terminal side management server 2, but the terminal side management server 2 may also have the functions of the monitoring apparatus 1. In the following description, it is assumed that the monitoring apparatus 1 and the center side management server 6 transmit and receive information between them.

Although only one monitoring apparatus 1 and only one terminal side management server 2 are shown in FIG. 1, in actuality, the device remote monitoring system is constructed such that a plurality of monitoring apparatuses 1, a plurality of terminal side management servers 2, and the center side management server 6 which centrally manages these monitoring apparatuses 1 and terminal side management servers 2 communicate with each other via the communication line 8.

Examples of the devices 3, 4, and 5 include a printer (such as an electrophotographic type printer or an ink jet type printer) as an image forming apparatus, a scanner as an image reading apparatus, a facsimile as an image communication apparatus, a digital multifunction apparatus as an image forming apparatus having a printer function and a facsimile function, a personal computer as an information processing apparatus, and a print server as an image processing apparatus. The image forming apparatus will be described later in further detail. Further, personal computers, not shown, are connected to the LAN 9 in the same manner as a computer 501 shown in FIG. 7, and have a function of generating PDL (Page Description Language) data from predetermined application data, for example, via an OS (Operating System) or a printer driver, and then transmitting the generated PDL data to the devices 3, 4, and 5 for output.

The monitoring apparatus 1 collects maintenance information including at least operation information such as operative statuses, the residual toner quantity, and the number of printed sheets counted for respective sheet sizes of the devices 3, 4, and 5 (such as a printer, a facsimile, and a multi-function machine), operation information including CPU status, memory utilization status, and usage of rental application programs of the personal computers, sheet jam information of he devices 3, 4, and 5, and various types of failure information including the number of restarts occurring in the personal computers.

Figure 2:
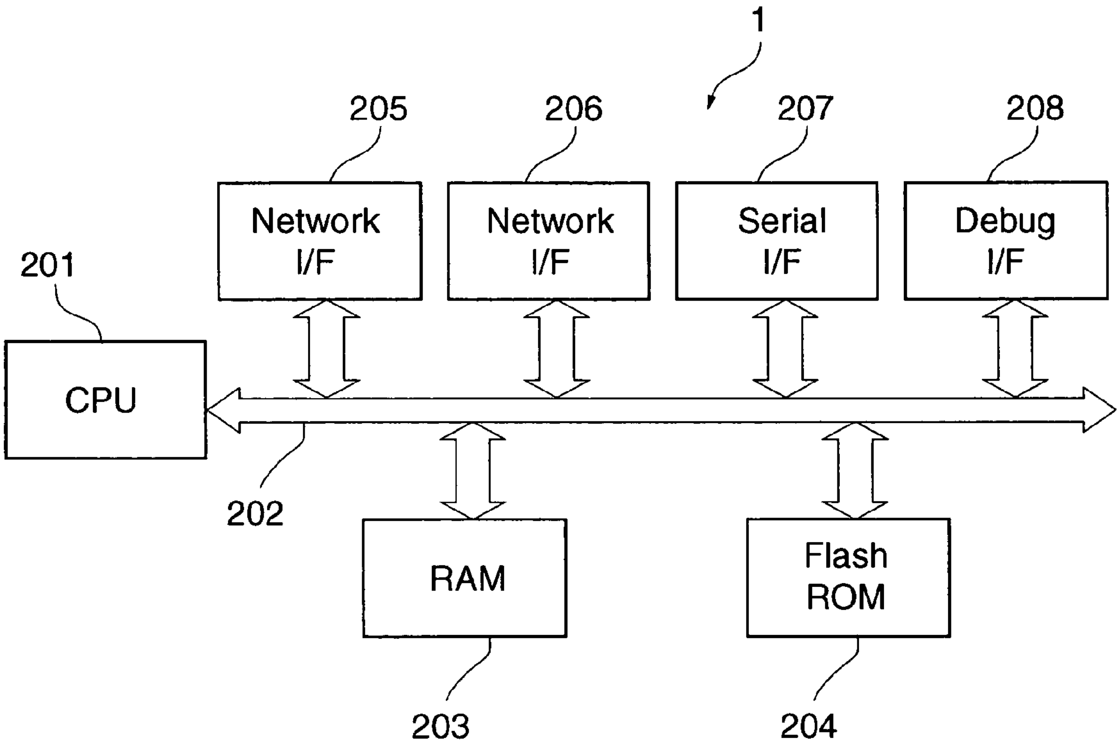
FIG. 2 is a block diagram showing the hardware construction of the monitoring apparatus in FIG. 1.

FIG. 2 is a block diagram showing the hardware construction of the monitoring apparatus 1 in FIG. 1. The monitoring apparatus 1 is comprised of a CPU 201, a bus 202, a RAM 203, and a flash ROM 204, as well as a plurality of interfaces (hereinafter simply referred to as "I/F") for various applications, namely, network I/Fs 205 and 206, a serial I/F 207, and a debug I/F 208, all of which are provided in an ordinary information processing apparatus.

The CPU 201 controls the respective component parts 203 to 208 independently and/or integrally, and carries out processes shown in flowcharts of FIGS. 3 to 6, 9, and 15 to 19 according to programs stored in the flash ROM 204. The bus 202 is a common signal path for transmitting and receiving data between the component parts constituting the monitoring apparatus 1 in FIG. 2. The RAM 203 is a storage means which can electrically store information and is also rewritable. The flash ROM 204 is a non-volatile storage means that is electrically rewritable, and can also maintain information without power supply. The network I/Fs 205 and 206 exchange information with external apparatuses via the network. The serial I/F 207 exchange information by RS-232C serial communication. The debug I/F 208 is a serial communication section used for a debug application.

Although the monitoring apparatus 1 may be comprised of an input device such as a keyboard, a display section, a display control section, and the like, the monitoring apparatus 1 permits its settings to be changed such that a PC carried by a service person, for example, is connected to the network I/F 205 or 206 of the monitoring apparatus 1 so that a configuration program stored within the monitoring apparatus 1 is started from the PC as described later. This can dispense with the provision of the input device, display section, and display control section, to thereby enable the monitoring apparatus 1 to be constructed at a low cost.

It suffices that the terminal side management server 2, the personal computers, not shown, the center side management server 6, and the center side client PC 7 appearing in FIG. 1 have the construction of an ordinary information processing apparatus, and detailed description thereof, therefore, is omitted.

Figure 3:
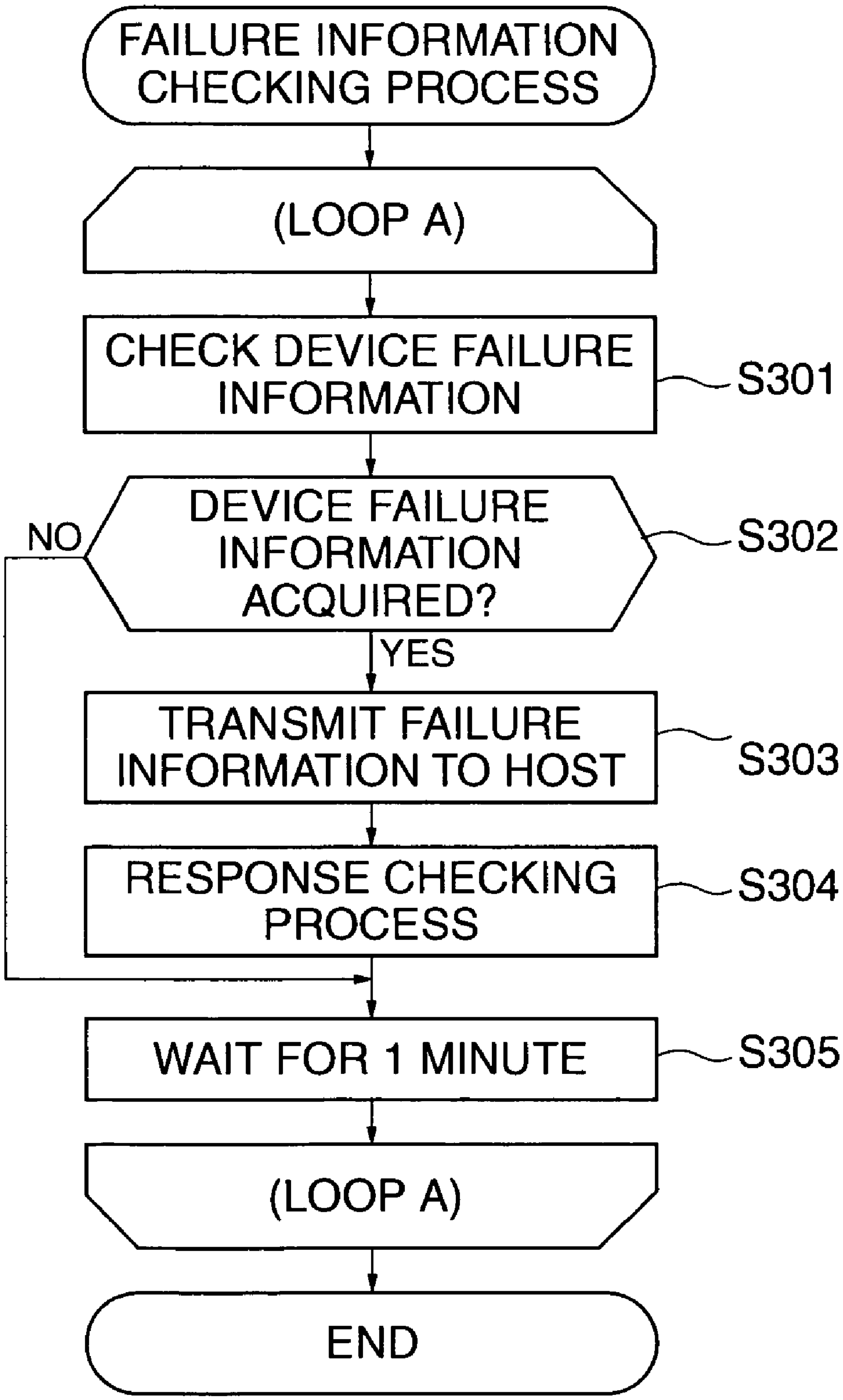
FIG. 3 is a flow chart showing a failure information checking process carried out by the monitoring apparatus.
Figure 4:
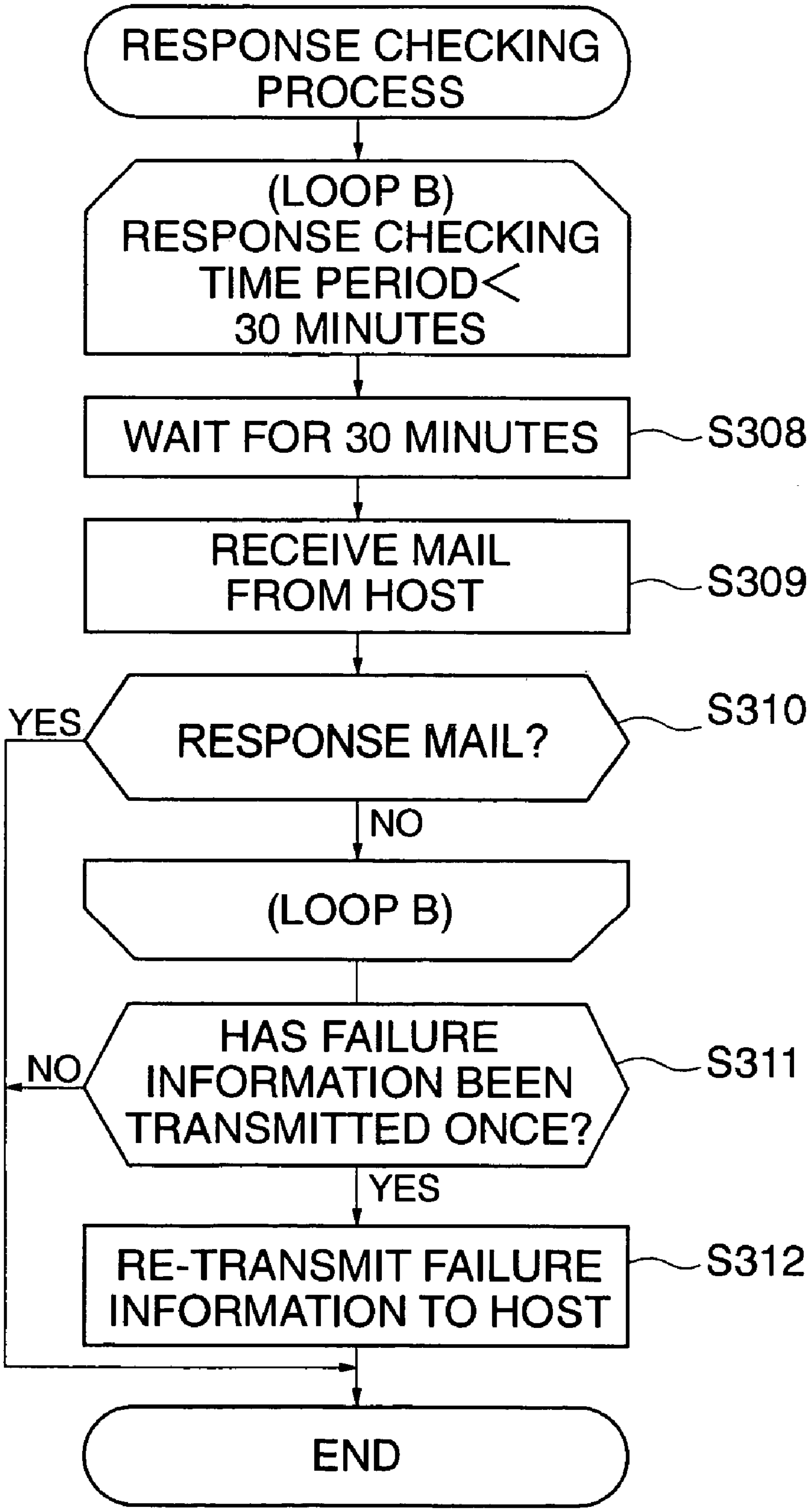
FIG. 4 is a flow chart showing a response checking process carried out in a step S304 in FIG. 3.

FIG. 3 is a flowchart showing a failure information checking process carried out by the monitoring apparatus 1 in FIG. 1. FIG. 4 is a flowchart showing a response checking process carried out by the monitoring apparatus 1. In the following description of the failure information checking process in FIG. 3 and the response checking process in FIG. 4, it is assumed that information is transmitted from the monitoring apparatus 1 to the terminal side management server 2, the center side management server 6 (hereinafter referred to as "the host 6"), or the center side client PC 7 using SMTP (Simple Mail Transfer Protocol), and the monitoring apparatus 1 receives information using POP (Post Office Protocol).

In FIG. 3, the monitoring apparatus 1 starts a failure information checking program for checking for failure information of the devices 3, 4, and 5 to be monitored, and carries out processing in steps S301 to S305 for the devices 3, 4, and 5 to be monitored, thereby carrying out failure information checking processing at time intervals of one minute, for example. First, in the step S301, the monitoring apparatus 1 accesses the devices 3, 4, and 5 to be monitored via the LAN 9 to obtain failure information. If it is determined whether or not failure information has been acquired from the devices 3, 4, and 5 in the step S301, and if it is determined in the step S302 that failure information has been acquired, and the process proceeds to the step S303.

In the step S303, the monitoring apparatus 1 transmits the failure information acquired in the step S302 to the host 6. Then, in the step S304, the monitoring apparatus 1 carries out the response checking process (FIG. 4) for waiting for a response from the host 6. On the other hand, if the monitoring apparatus 1 determines in the step S302 that failure information has not been acquired from any of the devices 3, 4, and 5, the process proceeds to the step S305 wherein the monitoring apparatus 1 waits for one minute for checking for failure information at time intervals of one minute, and then the process returns to the step S301.

In FIG. 4, after transmitting the failure information to the host 6 in the step S303 in FIG. 3, the monitoring apparatus 1 carries out the response checking process which is started in the step S304. In the response checking process, it is configured such that upon receipt of failure information from the monitoring apparatus 1, the host 6 transmits information acknowledging the reception of the failure information by e-mail (hereinafter simply referred to as "mail") to the monitoring apparatus 1. In the response checking process, the monitoring apparatus 1 waits for a response from the host 6 for 30 minutes at the maximum while repeating processing in the following steps S308 to S310 at time intervals of 30 seconds, for example, and transmits the failure information again to the host 6 only once if the response has not been received in that 30-minute time period.

In the step S308, the monitoring apparatus 1 waits for 30 seconds so as to carry out processing in the steps S308 to S310 at the time intervals of 30 seconds. Then, in the step S309, the monitoring apparatus 1 receives a mail from the host 6, and determines in the step S310 whether or not the received mail is a response mail indicating the reception of the failure information. If it is determined in the step S310 that the received mail is the response mail, the response checking process is terminated. On the other hand, if it is determined in the step S310 that the received mail is not the response mail, the process returns to the step S308 unless more than 30 minutes have elapsed after the start of the response checking program, or proceeds to a step S311 otherwise.

In the step S311, the monitoring apparatus 1 determines whether the number of times the monitoring apparatus 1 has transmitted the failure information to the host 6 is one or not. If the number of transmissions is not one, that is, the failure information has already been re-transmitted to the host 6, the process is terminated. On the other hand, if it is determined in the step S311 that the number of transmissions is one, that is, the failure information has not been re-transmitted to the host 6, the monitoring apparatus 1 re-transmits the failure information to the host 6 in a step S312. In this way, the failure information is re-transmitted only once.

Figure 5:
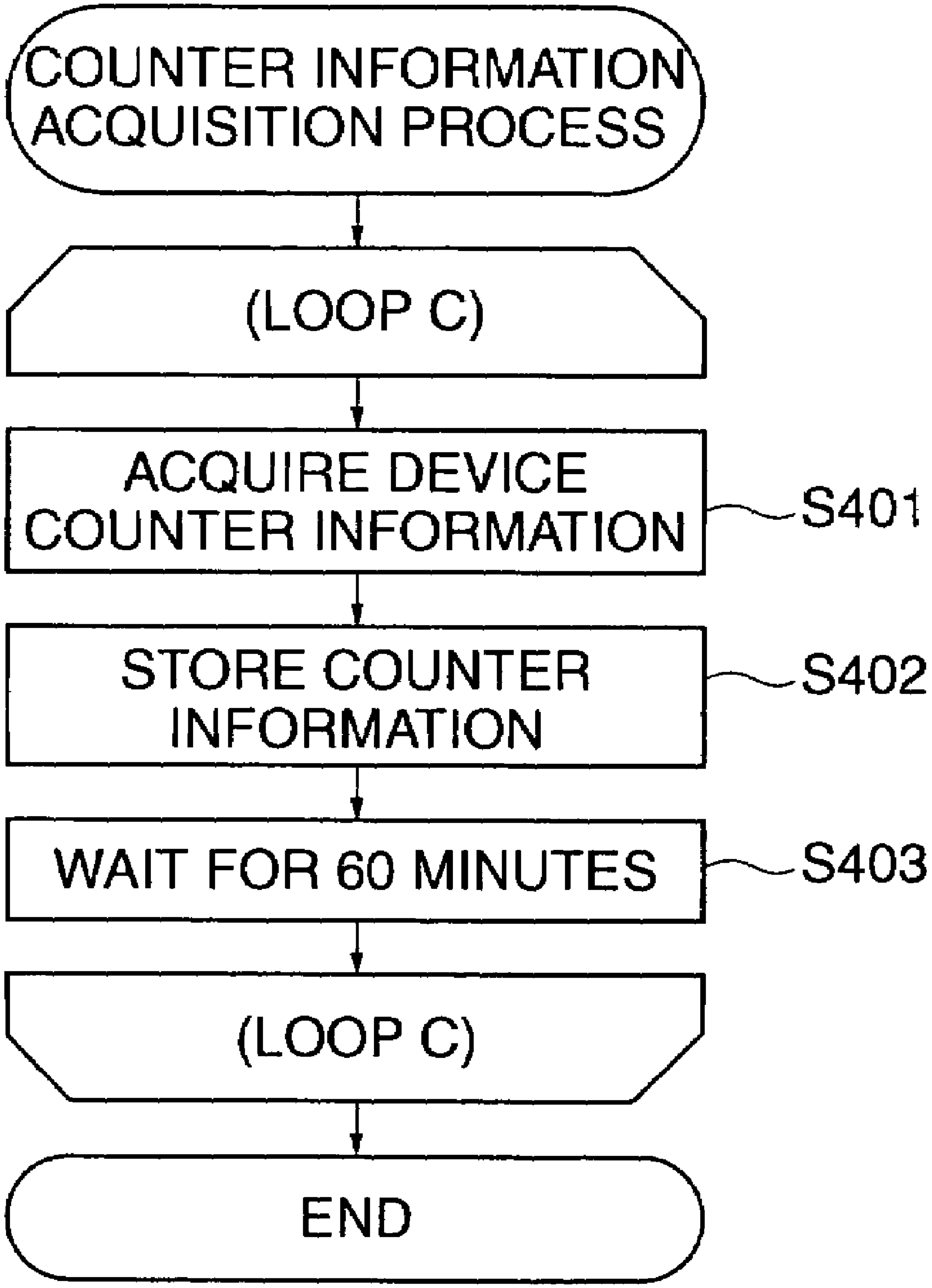
FIG. 5 is a flow chart showing a counter information acquisition process carried out by the monitoring apparatus.
Figure 6:
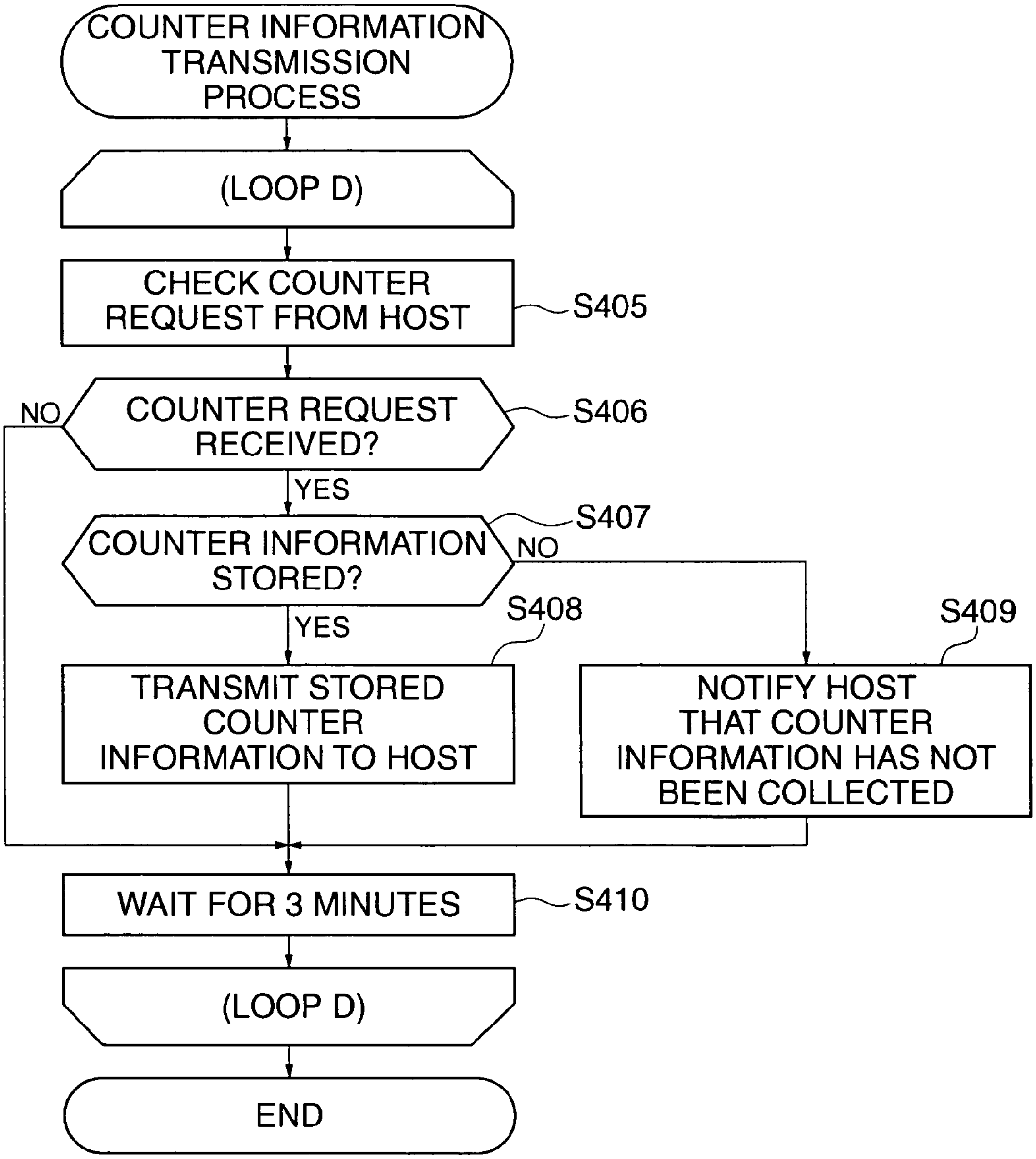
FIG. 6 is a flow chart showing a counter information transmission process carried out by the monitoring apparatus.

FIG. 5 is a flowchart showing a counter information acquisition process in which the monitoring apparatus 1 acquires counter information of the devices 3 to 5 and the personal computers. FIG. 6 is a flowchart showing a counter information transmission process in which the monitoring apparatus 1 transmits counter information of the devices 3 to 5 and the personal computers to the host 6. In the present embodiment, counter information refers to information including part or all of the above-mentioned maintenance information of the devices 3 to 5 and the personal computers, and the processes in FIGS. 5 and 6 are carried out for each of the devices.

In FIG. 5, the monitoring apparatus 1 starts a counter information acquisition program for acquiring the counter information, to execute the following steps S401 to S403 for the devices 3, 4, and 5 to be monitored at time intervals of 60 minutes, for example, thereby preparing for a request from the host 6 for acquiring the counter information. First, in the step S401, the monitoring apparatus 1 acquires the counter information from each of the devices. Then, in the step S402, the monitoring apparatus 1 stores the counter information acquired from the devices in the step S401 in the flash ROM 204 to prepare for the request from the host 6 for the counter information. On this occasion, if the data format of the counter information acquired from the devices 3, 4, and 5 is different from the data format of the counter information transmitted to the host 6, the data may be converted when the counter information is stored. Alternatively, this data conversion may be carried out when the host 6 requests counter information. Then, in the step S403, the monitoring apparatus 1 waits for 60 minutes before carrying out the same processing for counter information acquisition 60 minutes later, and then the process returns to the step S401.

In FIG. 6, the monitoring apparatus 1 starts a counter information transmission program for transmitting counter information in response to a request from the host 6 for the counter information. The host 6 requests the counter information by transmitting a mail including a counter information request command to the monitoring apparatus 1. In the counter information transmission process, a mail from the host 6 is checked at time intervals of three minutes, for example, in preparation for a request for the counter information. In the counter information transmission process in FIG. 6, first, in a step S405, the monitoring apparatus 1 checks for a request from the host 6 for counter information. Then, it is determined in a step S406 whether or not a request for the counter information has been given, and the process proceeds to a step S410 if it is determined that the request has not been given. On the other hand, if it is determined in the step S406 that the request for the counter information has been given, the process proceeds to a step S407.

In the step S407, the monitoring apparatus 1 determines whether or not the counter information is stored by the above described counter information acquisition process in FIG. 5. If it is determined that the counter information is stored, the monitoring apparatus 1 transmits the stored counter information to the host 6 in a step S408. By execution of the counter information transmission process, the counter information transmitted from the monitoring apparatus 1 to the host 6 is shared by the center side client PC 7 as described above, so that an operator, for example, can refer to the counter information. On the other hand, if it is determined that counter information is not stored in the step S407, the monitoring apparatus 1 notifies the host 6 that the counter information has not been collected (step S409). Then, in the step S410, the monitoring apparatus 1 waits for three minutes, for example, to check for a request from the host 6 for counter information at time intervals of three minutes.

In this way, the failure information checking process in FIG. 3, the response checking process in FIG. 4, the counter information acquisition process in FIG. 5, and the counter information transmission process in FIG. 6 make it possible to remotely and centrally manage the maintenance information of image forming apparatuses and devices such as personal computers used by the user.

Figure 7:
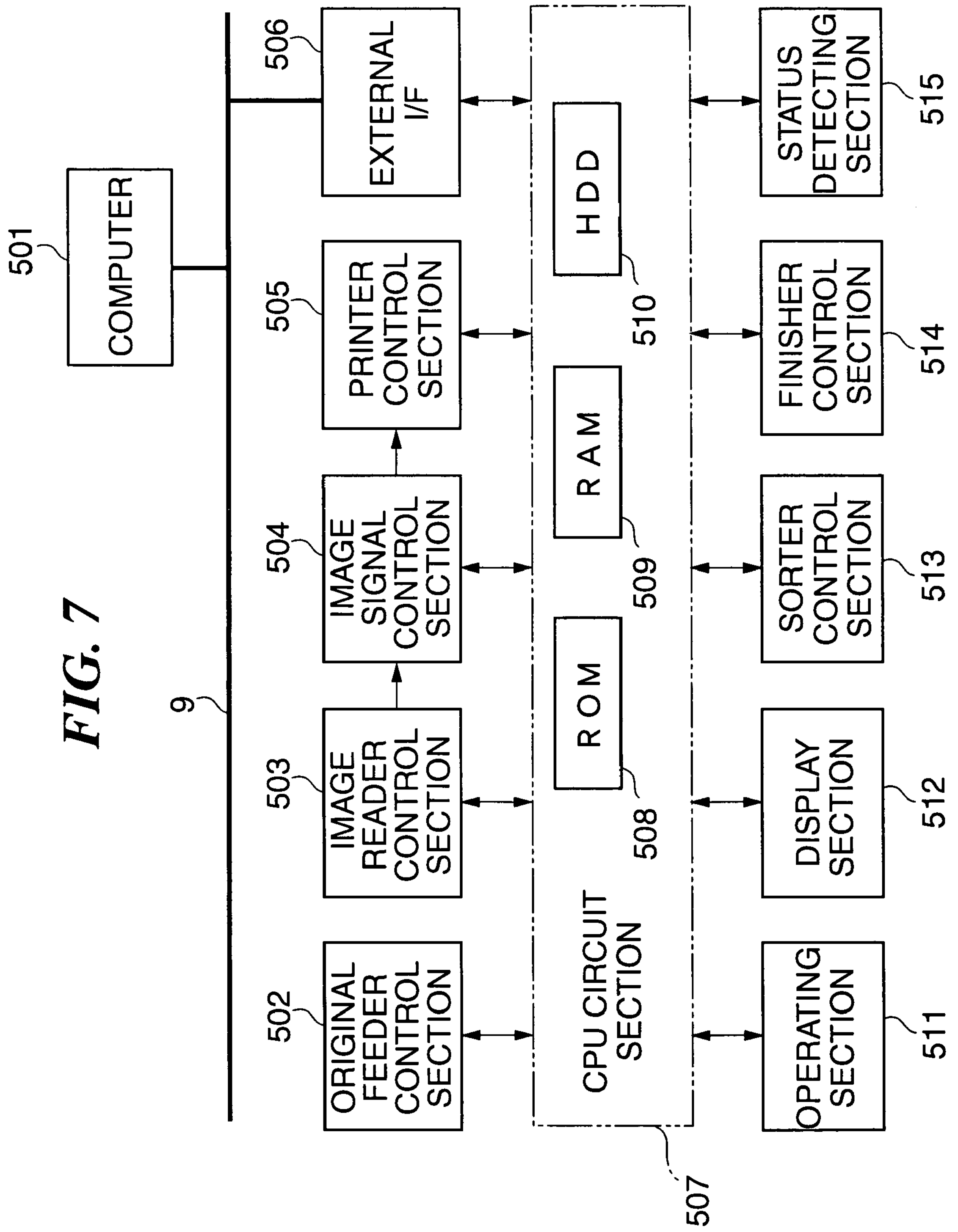
FIG. 7 is a block diagram showing the construction of a controller that controls the overall operation of an entire image forming apparatus which is an example of devices appearing in FIG. 1.

FIG. 7 is a block diagram showing an example of the construction of a controller that controls an entire image forming apparatus which is an example of the devices 3, 4, and 5 in FIG. 1. The controller of the image forming apparatus is comprised of an original feeder control section 502, an image reader control section 503, an image signal control section 504, a printer control section 505, an external I/F 506, a CPU circuit section 507, a sorter control section 513, a finisher control section 514, and a status detecting section 515. In FIG. 7, reference numeral 511 denotes an operating section of the image forming apparatus; 512, a display section of the image forming apparatus; and 501, the computer connected to the image forming apparatus via the LAN 9.

The CPU circuit section 507 is comprised of a CPU, not shown, a ROM 508, a RAM 509, and a hard disc drive (HDD) 510. The CPU controls the original feeder control section 502, the image reader control section 503, the image signal control section 504, the printer control section 505, the external I/F 506, the operating section 511, the display section 512, the sorter control section 513, the finisher control section 514, and the status detection section 515 in accordance with control programs stored in the ROM 508. The ROM 508 stores the control programs. The RAM 509 temporarily stores control data, and is also used as a working area for calculations required for the control. The hard disk drive 510 stores information required for the control programs, and information received from the original feeder control section 502 through the status detection section 515.

The original feeder control section 502 provides control to drive an original feeder, not shown, which automatically feeds an original set on an original stacking section to an original reading position according to an instruction from the CPU circuit 507. The image reader control section 503 provides control to drive a scanner unit, not shown, which scans an original, an image sensor, not shown, which photoelectrically converts an optical image of the original to an electric signal, and other like devices, thereby transmitting an analog image signal output from the image sensor to the image signal control section 504. The image signal control section 504 carries out various processing on a digital signal converted from the analog image signal, thereby converting this digital signal to a video signal, and outputs the video signal to the printer control section 505. The processing by the image signal control section 504 is controlled by the CPU control circuit 507.

The external I/F 506 carries out various kinds of processing on a digital image signal input from the computer 501 via the LAN 9 and a LAN interface, not shown, thereby converting the digital image signal to a video signal, and outputs the video signal to the printer control section 505. In addition, the external I/F 506 communicates with the monitoring apparatus 1 via the LAN 9 and the LAN interface, not shown. The printer control section 505 drives an exposure controller, not shown, which controls exposure of a photosensitive member based on the input video signal. The operating section 511 includes a plurality of keys for setting various functions relating to the image formation, and a display for displaying information indicating settings, and so forth. The operating section 511 outputs key signals corresponding to operations of the keys to the CPU circuit 507, and displays information corresponding to signals from the CPU circuit 507 on the display section 512.

The sorter control section 513 provides control to drive a sorter mechanism, not shown, for sorting sheets on which images have been formed. The finisher control section 514 provides control to drive a finisher mechanism, not shown, which carries out post processing on sheets, such as punching and stapling of sheets on which images have been formed. The sorter control section 513 and the finisher control section 514 operate based on signals from the CPU circuit section 507 according to inputs from a user via the external I/F 506 or settings input from the operating section 511. The state detecting section 515 collects status information from the various blocks shown in FIG. 7, carries out detections such as abnormality detection, carries out determinations based on the detection results, and notifies the CPU circuit section 507 of the determination results. According to this notification, the CPU circuit 507 displays abnormalities on the display section 512, and notifies the computer 501 and the like of the abnormalities via the external I/F 506.

Figure 8:
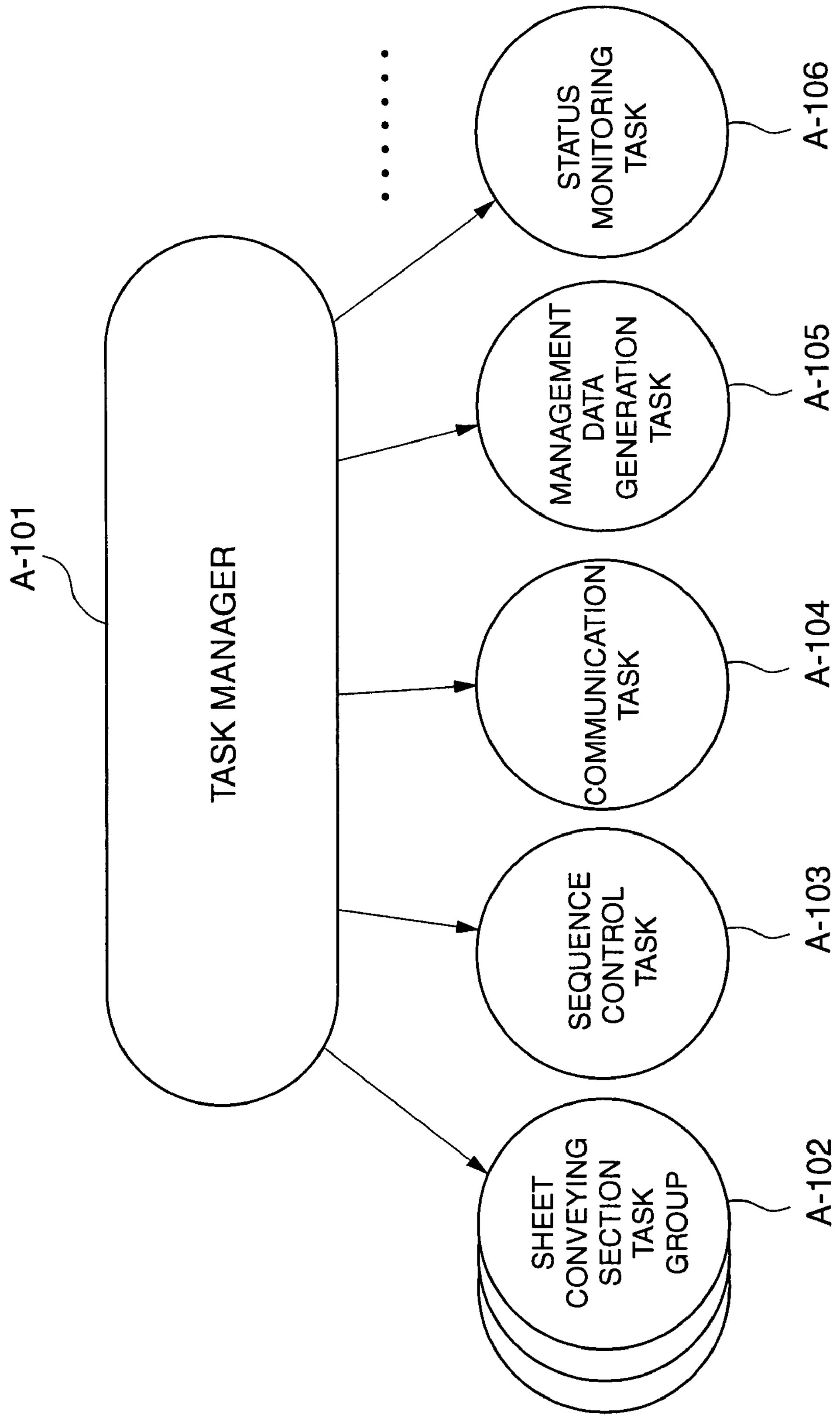
FIG. 8 is a diagram showing the software construction of the image forming apparatus in FIG. 7.

FIG. 8 is a block diagram showing the software construction of the image forming apparatus in FIG. 7. The image forming apparatus carries out a task manager A-101, a sheet conveying section task group A-102, a sequence control task A-103, a communication task A-104, a management data generation task A-105, and a status monitoring task A-106.

The task manager A-101 manages a plurality of tasks concurrently. The sheet conveying section task group A-102 is a group of tasks which manage the conveyance of originals and sheets on which images are to be formed. The sequence control task A-103 carries out management of the entire image forming apparatus. The communication task A-104 communicates with the monitoring apparatus 1.

The management data generation task A-105 generates data for the remote management of the present embodiment. The image forming apparatus counts the number of generations of the operation information for each sheet size, each processing mode, each sheet type, and each of black-and-white and color each time an image forming operation is carried out. The counting of the number of generations of the operation information is carried out by the management data generation task A-105, and the resulting counts are stored in the hard disk drive 510 of the image forming apparatus. In a similar manner, status information (failure information) relating to states such as jam, error, and alarm is stored in a predetermined data format in the hard disk drive 510 of the image forming apparatus. Further, there are provided counters (component part counters) for respective sections of the image forming apparatus, that indicate replacement cycles of consumable components, and degrees of usage of the consumable components, and the counts obtained by execution of the management data generation task A-105 are stored in the hard disk drive 510 of the image forming apparatus.

The status monitoring task A-106 detects abnormalities (jams, errors, and alarms) in the image forming apparatus, or detects status changes in predetermined devices, and when the status monitoring task A-106 detects an abnormality or a status change, status information in a predetermine format is stored in the hard disk drive 510 of the image forming apparatus.

Figure 9:
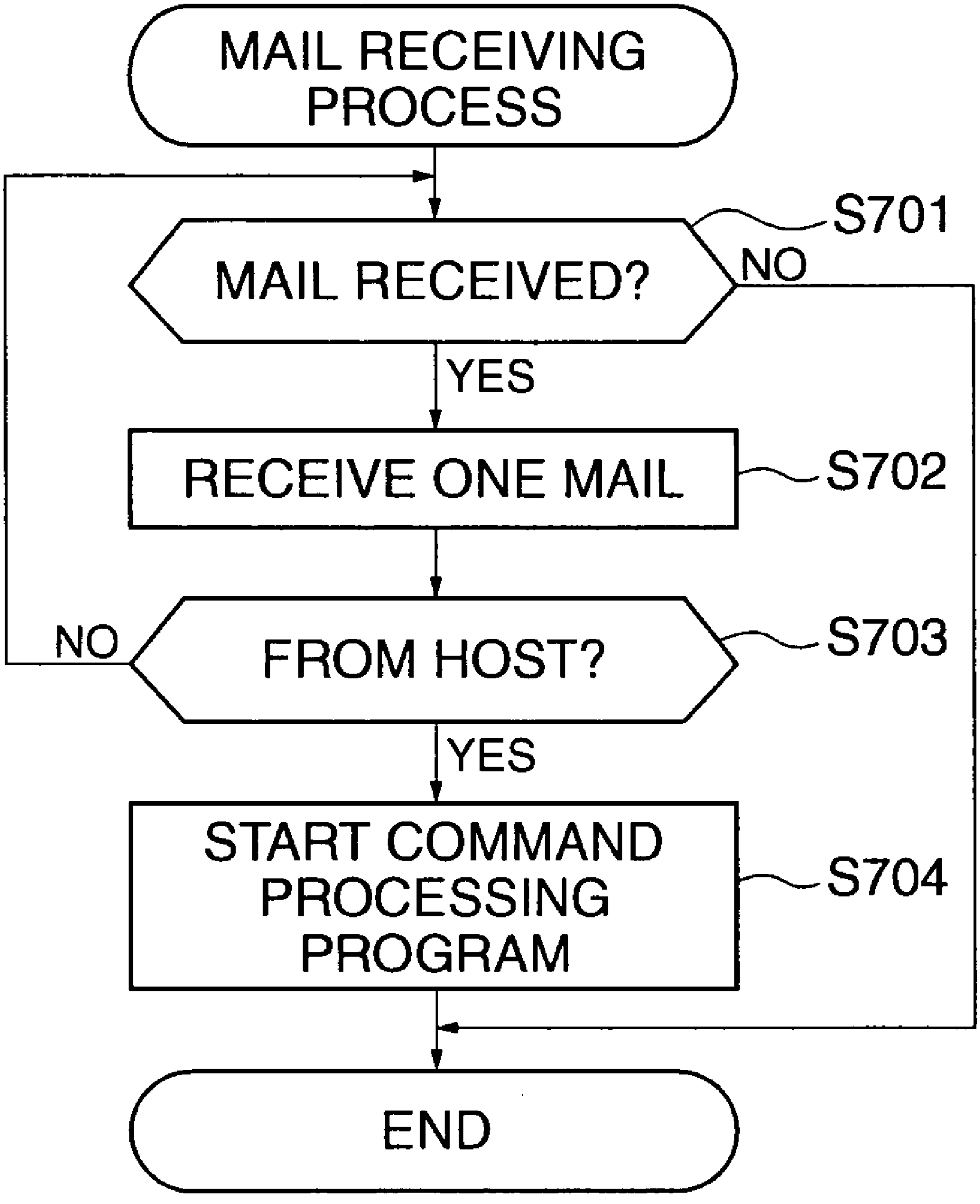
FIG. 9 is a flow chart showing an e-mail receiving process carried out by the monitoring apparatus.

FIG. 9 is a flow chart showing a mail receiving process in which the monitoring apparatus 1 in FIG. 1 receives a mail including an instruction from the host 6 and performs processing in accordance with the instruction. The mail receiving process is scheduled and started at regular time intervals, and is terminated upon receiving one mail from the host 6 or completing the receipt of all mails.

First, in a step S701, the monitoring apparatus 1 checks whether a mail has reached a mail server or not. As the mail server, the terminal side management server 2 in FIG. 1 may be used, or an additionally installed mail server may be used.

If it is found in the step S701 that no mail has reached the mail server, the mail receiving process is terminated. If it is found in the step S701 that a mail has reached the mail server, the process proceeds to a step S702 wherein the monitoring apparatus 1 receives only one mail from the mail server.

Then, in a step S703, the monitoring apparatus 1 determines whether or not the received mail is a mail from the host 6. In the present embodiment, the monitoring apparatus 1 recognizes a mail address of the host 6, and hence determines whether or not the received mail is a mail from the host 6 according to whether or not a sender's mail address is the same as the mail address of the host 6. If it is determined in the step S703 that the received mail is not a mail from the host 6, the monitoring apparatus 1 determines that the received mail is a junk mail and discards it. The process then returns to the step S701 wherein the monitoring apparatus 1 receives the next mail. If it is determined in the step S703 that the received mail is a mail from the host 6, the monitoring apparatus 1 interprets an instruction (request) from the host 6 by decoding the mail. The process then proceeds to the step S704 wherein the monitoring apparatus 1 starts a processing program suitable for the instruction, and then the mail receiving process is terminated.

Figure 10:
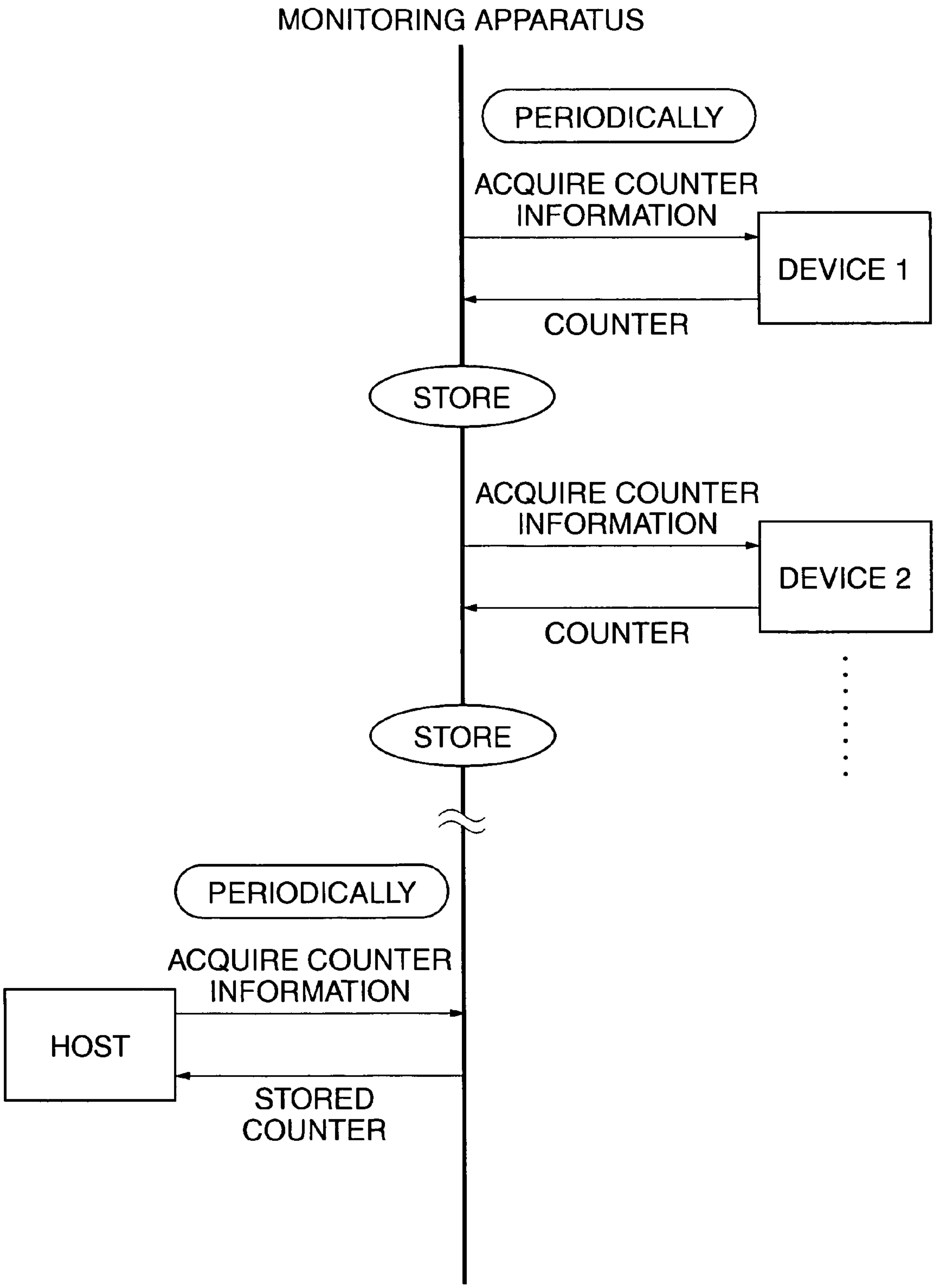
FIG. 10 is a view useful in explaining a sequence in which the monitoring apparatus acquires counter information from devices, and a sequence in which a center side management server in FIG. 1 acquires counter information from the monitoring apparatus.

FIG. 10 is a diagram useful in explaining a sequence in which the monitoring apparatus 1 acquires counter information from the devices 3 to 5 in the device remote monitoring system in FIG. 1. As described previously with reference to FIG. 8, each device counts the number of generations of operation information for each sheet size, each processing mode, each sheet type, and each of black-and-white and color each time image forming processing is carried out, and holds the result of counting as counter information. The monitoring apparatus 1 periodically accesses each of the devices which it monitors, for counter information, and acquires counter information and stores the same in the flash ROM 204. On the other hand, the host 6 periodically requests the monitoring apparatus 1 to acquire counter information, and in response to the request, the monitoring apparatus 1 sends the counter information stored in the flash ROM 206 to the host 6.

Figure 11:
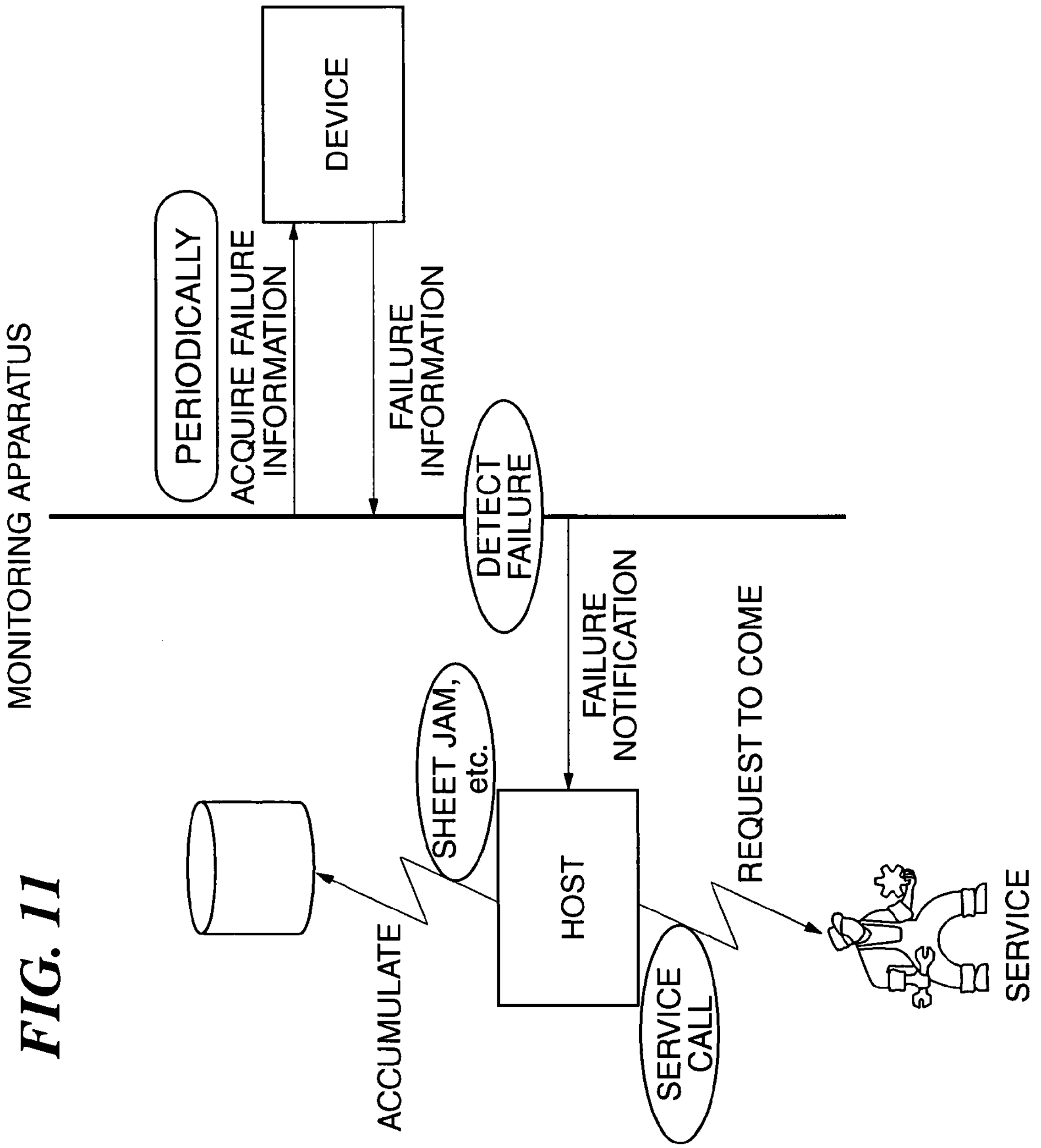
FIG. 11 is a view useful in explaining a processing sequence which is executed when a failure occurs in a device in FIG. 1.

FIG. 11 is a diagram useful in explaining a processing sequence which is executed by the monitoring apparatus 1 when a failure occurs in any of the devices in the device remote monitoring system in FIG. 1. The monitoring apparatus 1 periodically accesses each of the devices which it monitors, for failure information therefrom, and acquires failure information and analyzes the same. If the analyzed failure information is indicative of a failure which should be notified to the host 6 (i.e. a failure called a service call, such as sheet jam, which should be processed by a service person), the monitoring apparatus 1 sends the failure information to the host 6.

In the present embodiment, a failure which does not have to be notified to the host 6 means a failure which is estimated to have occurred as a result of a user's intention, such as "door open", i.e. opening of a maintenance door provided in the device, and is likely to be immediately coped with by the user. The host 6 which has received failure notification from the monitoring apparatus 1 carries out processing suitable for a failure indicated by the failure notification. If the failure is a service call, the host 6 requests a service person to come. If the failure is sheet jam or the like, the user can cope with it, but when sheet jam or the like repeatedly occurs, the device may have a failure which cannot be coped with by the user, and hence failure information is accumulated as statistical information in the database 11 on the center side.

Figure 12:
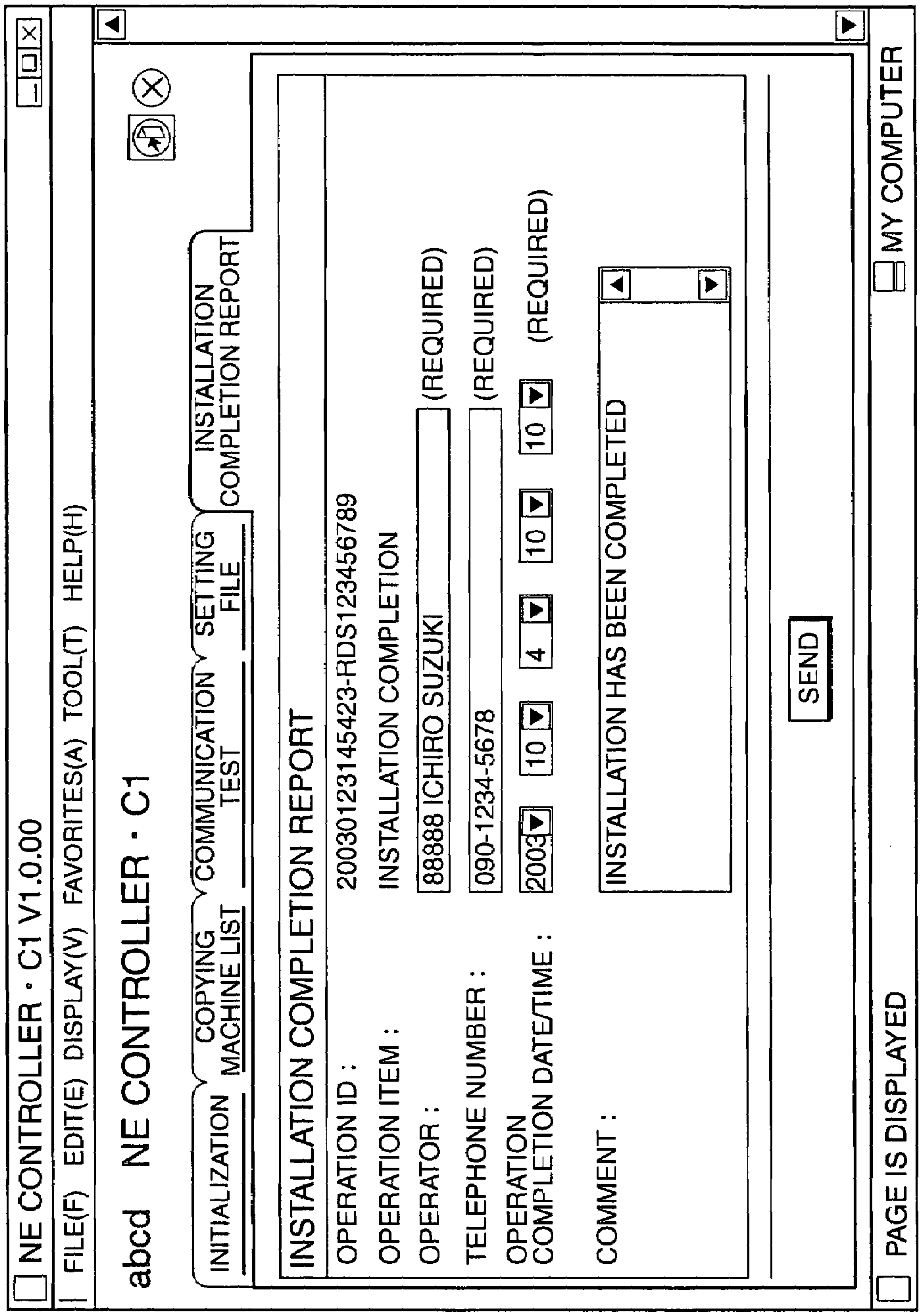
FIG. 12 is a view showing a screen displayed for generating/transmitting an installation completion report in an installation process carried out by the monitoring apparatus.

FIG. 12 is a view showing a UI (User Interface) screen which is displayed for a service person to input data and transmit the input data to the host 6 (step S1304 in FIG. 15) when registrations of various settings as to a gateway address, DNS address, POP address, POP port, POP authentication method, SMTP address, SMTP port, SMTP port authentication method for each device to be monitored by the monitoring apparatus 1 have been completed (step S1301 in FIG. 15), or when communication tests for checking whether communication with the device (step S1303) and whether communication with the host 6 has been properly carried out (step S1302) have been completed, during initial installation of the monitoring apparatus 1 in the device remote monitoring system in FIG. 1. The UI screen in FIG. 12 is displayed on a display section of a PC, which is connected to the network I/F 205 or 206 by the service person, in accordance with a setting program started by the monitoring apparatus 1.

Figure 15:
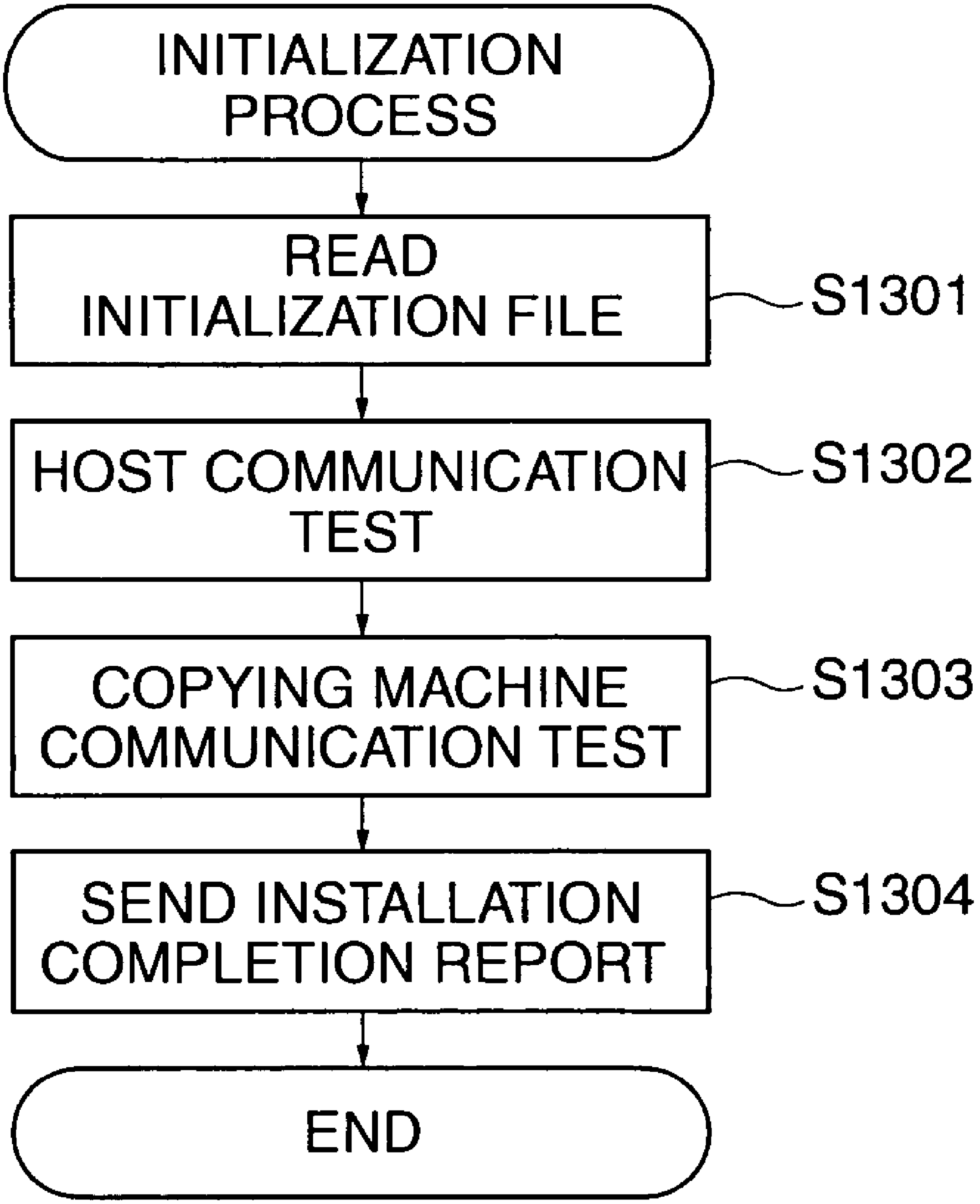
FIG. 15 is a flow chart showing an initial installation process carried out by the monitoring apparatus.

If the result (normal or error) of the communication tests in the steps S1302 and S1303 in an installation process described later with reference to FIG. 15 is automatically included in an installation completion report based on input through the UI screen in FIG. 12, the host 6 can report on the status of installation in an appropriate manner.

The UI screen in FIG. 12 enables completion of initialization for a plurality of devices to be reported via the monitoring apparatus 1 which manages maintenance information relating to the plurality of devices. This is more efficient than in the case where completion of initialization for each device is reported by each device. As shown in the UI screen in FIG. 12, operation information such as an operation ID which enables the host 6 to identify an operation session, an operation item, and operator's name and contact address (telephone number or mail address), as well as information indicative of operation completion date and time or installation completion date and time is sent to the host 6 via the monitoring apparatus 1.

Figure 13:
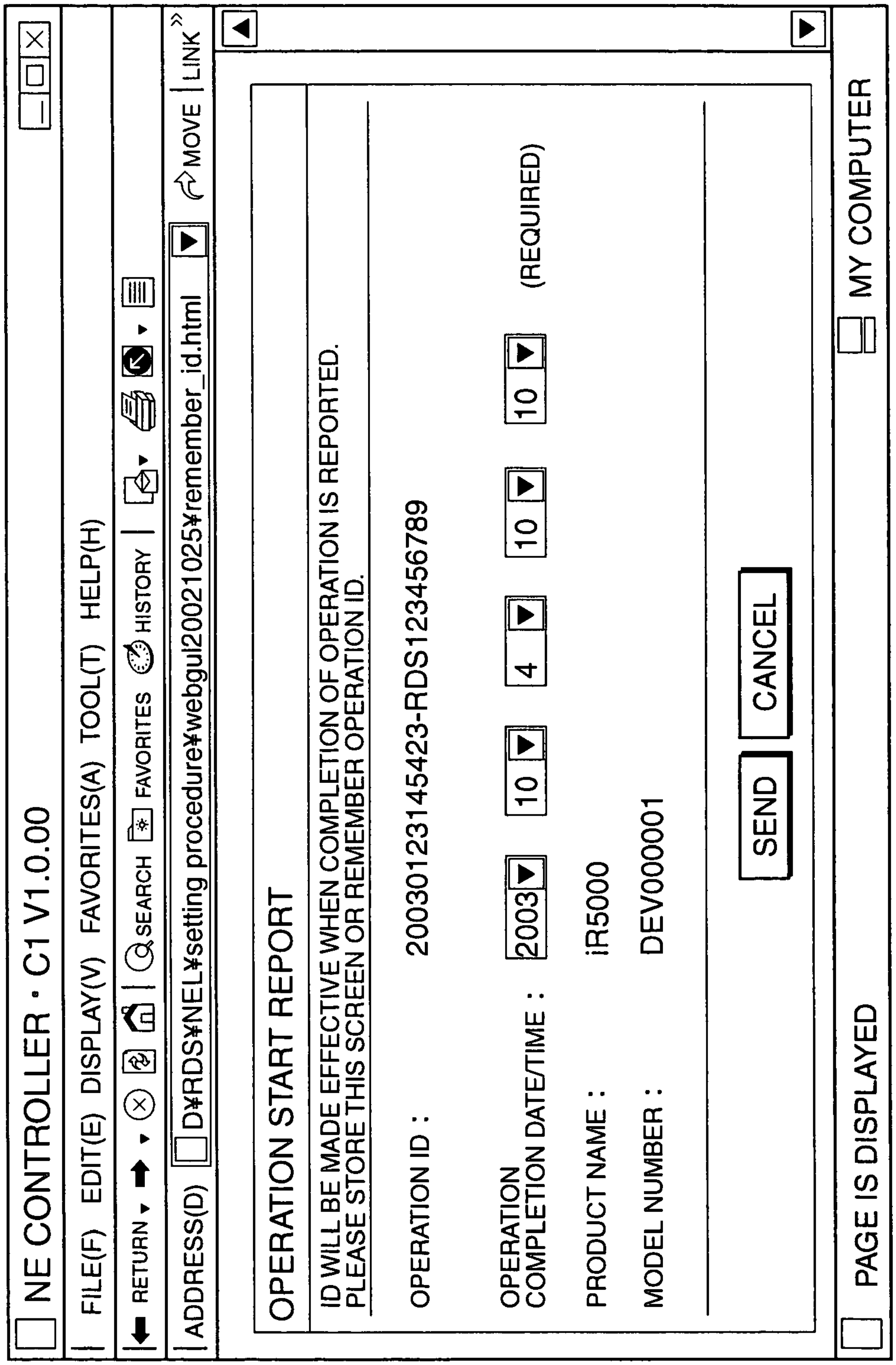
FIG. 13 is a view showing a screen displayed for generating/transmitting an operation start report in a setting changing process carried out by the monitoring apparatus are changed.

FIG. 13 is a view showing a UI screen which is displayed for a service person to input data and transmit the input data to the host 6 when change of settings relating to a device being monitored by the monitoring apparatus 1 is started after the monitoring apparatus 1 is installed in the device remote monitoring system. The UI screen in FIG. 13 is displayed on a display section of a PC, which is connected to the network I/F 205 or 206 by a service person, in accordance with a setting program started by the monitoring apparatus 1.

Figure 14:
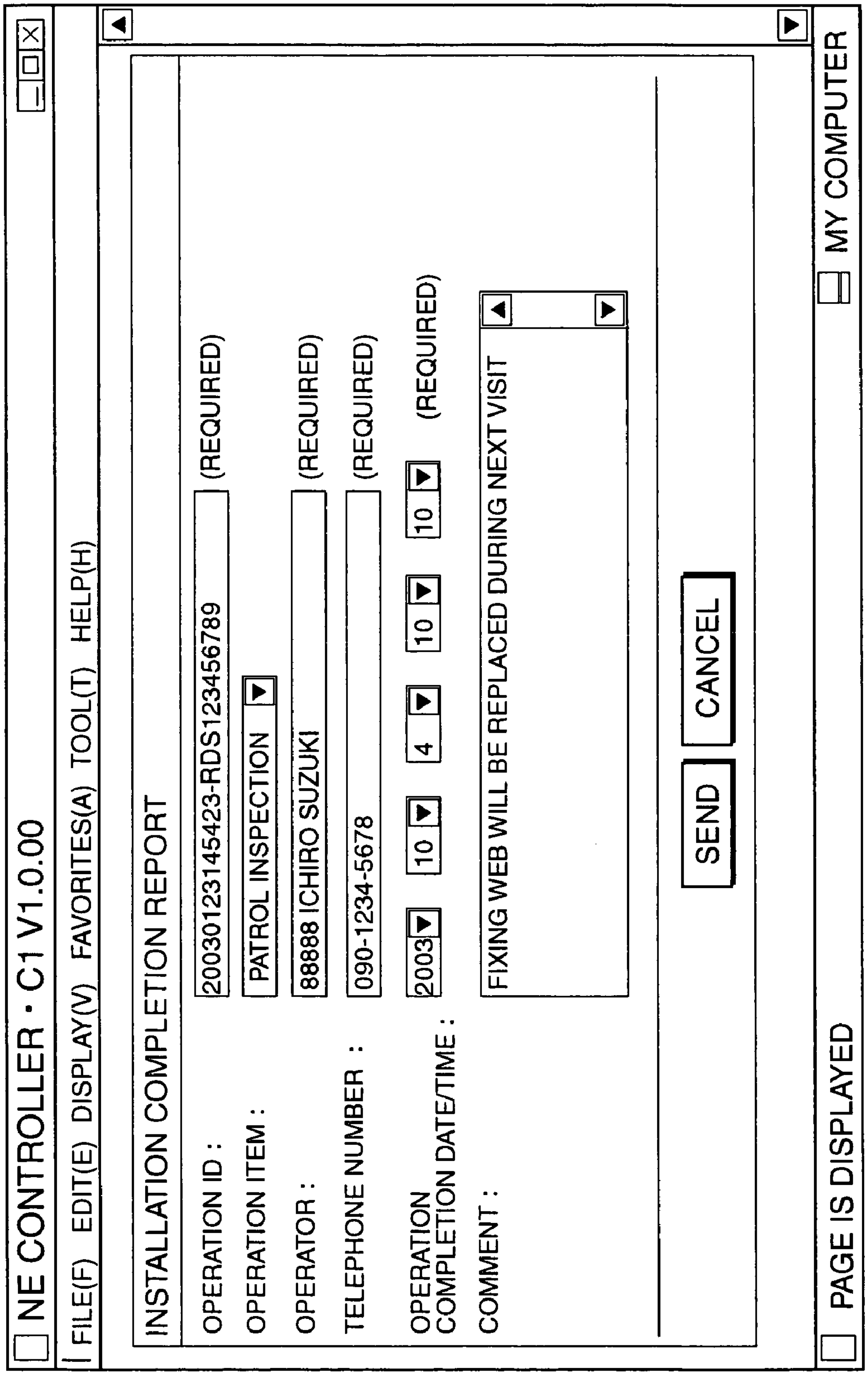
FIG. 14 is a view showing a screen displayed for generating/transmitting an operation completion report in the setting changing process carried out by the monitoring apparatus.

FIG. 14 is a view showing a UI screen which is displayed for a service person to input data and transmit the input data to the host 6 in timing in which the installation of the monitoring apparatus 1 for the device remote monitoring system has been completed using the UI screen appearing in FIGS. 12 and 13, or after that. The UI screen in FIG. 13 corresponds to processing in a step S1404 in FIG. 16, described later, and is displayed on a display section of a PC, which is connected to the network I/F 205 or 206 by a service person, in accordance with a setting program started by the monitoring apparatus 1.

In FIG. 14, an operation item ("patrol inspection" in FIG. 14) indicates what type of operation completion report will be sent. Examples of the operation item include "service person call" for repair work done by a service person when a serious error occurs in the device, in addition to the "patrol inspection". Information indicative of the type of the indicated operation item is included in an operation completion report which is sent to the host 6.

FIG. 15 is a flow chart showing an initialization process carried out by the monitoring apparatus 1. The initialization process is started when a service person connects a PC to the network I/F 205 or 206 of the monitoring apparatus 1, and starts a setting program in the monitoring apparatus 1. In the step S1301, the monitoring apparatus 1 reads an initialization file, which includes information indicative of an IP address and a mail address of the monitoring apparatus 1 itself, an IP address and a mail address of the host 6, server information for use in sending/receiving mails, authentication information, and information on devices to be monitored, from the connected PC. Then, in the step S1302, according to settings of the initialization file read in the step S1301, the monitoring apparatus 1 ascertains whether or not it is possible to communicate with the host 6, by actually sending and receiving a mail to and from the host 6 as a communication test.

Next, in the step S1303, according to the settings read in the step S1301, the monitoring apparatus 1 ascertains whether it is possible to communicate with the devices to be monitored by actually acquiring counter information from the devices as a communication test. If as a result of the communication tests in the steps S1302 and S1303, it is ascertained that the monitoring apparatus 1 can properly communicate with the host 6 and the devices, the process proceeds to the step S1304 wherein the service person generates an installation completion report relating to the monitoring apparatus 1 using the UI screen appearing in FIG. 12, and sends the installation completion report by mail to the host 6 so as to notify the host 6 that the steps S1302 and S1303 have been properly executed. The installation completion report includes an operation ID which identifies an operation session, an operation item, operator information such as operator's name and telephone number, installation completion date and time, and a memo which can be freely written. Further, the installation completion report which is sent by mail includes information for identifying the monitoring apparatus 1. Upon receipt of the installation completion report by mail from the monitoring apparatus 1, the host 6 starts periodically requesting the monitoring apparatus 1 to acquire counter information as described above with reference to FIG. 10.

Figure 16:
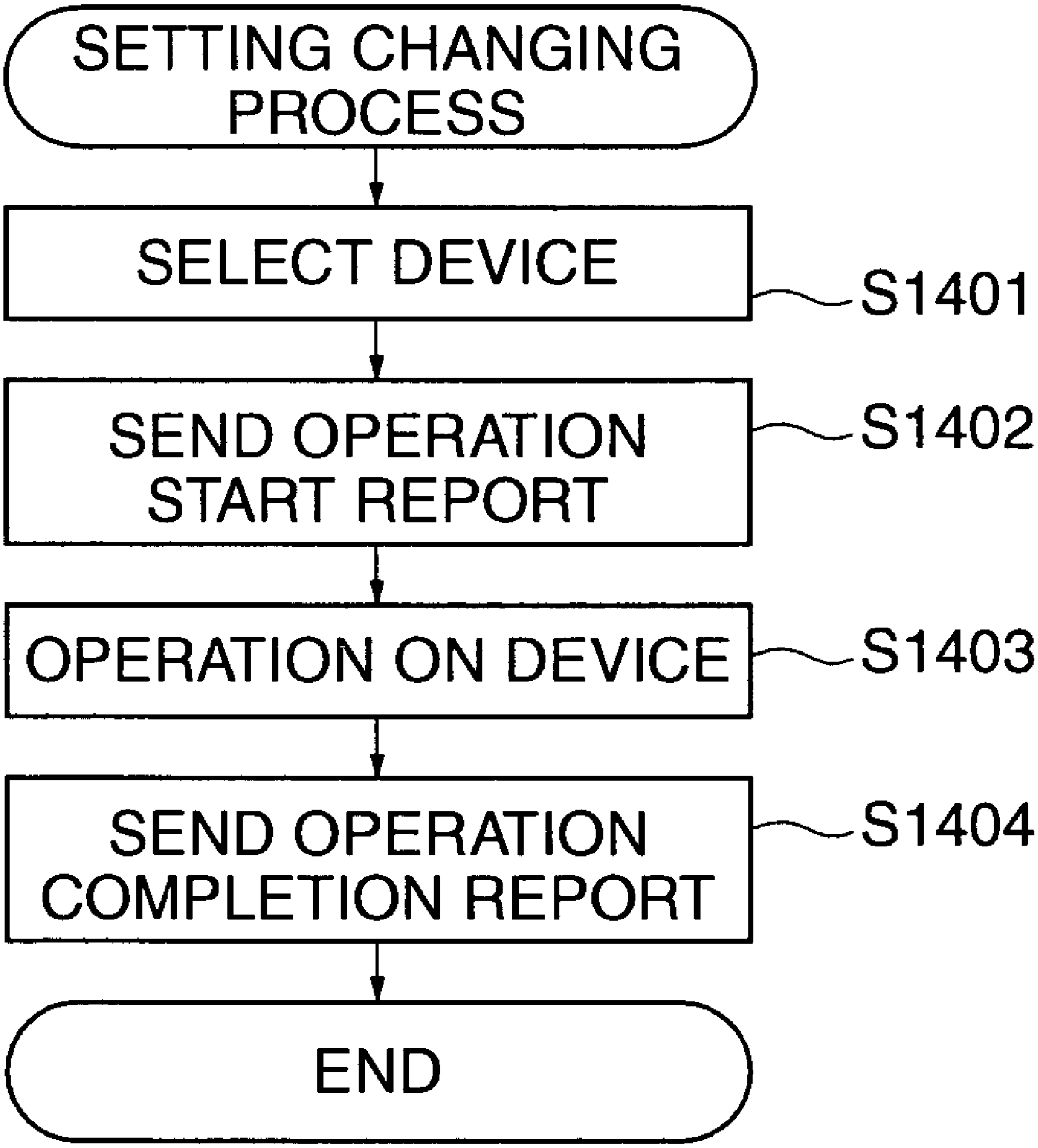
FIG. 16 is a flow chart showing a setting changing process carried out by the monitoring apparatus.

FIG. 16 is a flow chart showing a setting changing process carried out by the monitoring apparatus 1. The setting changing process is started when a service person connects a PC to the network I/F 205 or 206 and starts a setting program in the monitoring apparatus 1. The setting changing process is carried out after the installation completion report described above with reference to FIG. 15 is sent (step S1304).

In a step S1401, the service person selects a device whose settings are to be changed from among devices being monitored by the monitoring apparatus 1. The devices being monitored reflects information on devices included in the initialization file read into the monitoring apparatus 1 in the process in FIG. 15, and it is assumed that a plurality of devices are monitored.

Further, the monitoring apparatus 1 displays a list of the devices being monitored so that those to be subjected to processing in a step S1403, described below, can be identified. If the service person's PC is connected to the monitoring apparatus 1, the list of the devices being monitored is displayed on the display of the PC, too. In the example shown in FIG. 13, a device with a product name "iR5000" is selected.

In this way, the monitoring apparatus 1 can centrally manage maintenance information on a plurality of devices connected to the monitoring apparatus 1 via the network for communication therewith and can centrally send an operation start report and an operation completion report relating to maintenance such as patrol inspection for the plurality of devices. Therefore, it is possible to send a variety of reports to the host 6 in a more efficient manner compared with the case where an operation start report and an operation completion report relating to each device are sent from each device.

Next, in a step S1402, the service person uses the UI screen in FIG. 13 to produce an operation start report relating to the device selected from among the plurality of devices, and sends the generated operation start report to the host 6 by mail.

Next, in the step S1403, the monitoring apparatus 1 changes device settings stored therein, or operates any device itself. On this occasion, various failures such as a service call may occur in the device.

Examples of change of settings and operation of any device itself by the monitoring apparatus 1 in the step S1403 include change of various setting information stored in the monitoring apparatus 1 in the step S1301 as described above, giving an instruction for changing an IP address stored in a network board of any device, giving an instruction for collecting maintenance information on any device, and other management operations.

When the change of settings or operation of any device in the step S1403 is completed, the process proceeds to the step S1404 wherein the service person uses the UI screen in FIG. 14 to produce an operation completion report relating to the device, and transmits the generated operation completion report to the host 6 by mail. The operation start report includes an operation ID which identifies an operation session, and an operation starting date, as well as information on the device subjected to operation (e.g. product name and model number). The operation completion report includes an operation ID which identifies an operation session, an operation item, operator information such as operator's name and telephone number, an operation completion date, and a memo which can be freely written. Further, information which identifies the monitoring apparatus 1 is also included in the operation start report and the operation completion report which are sent by mail.

Figure 17:
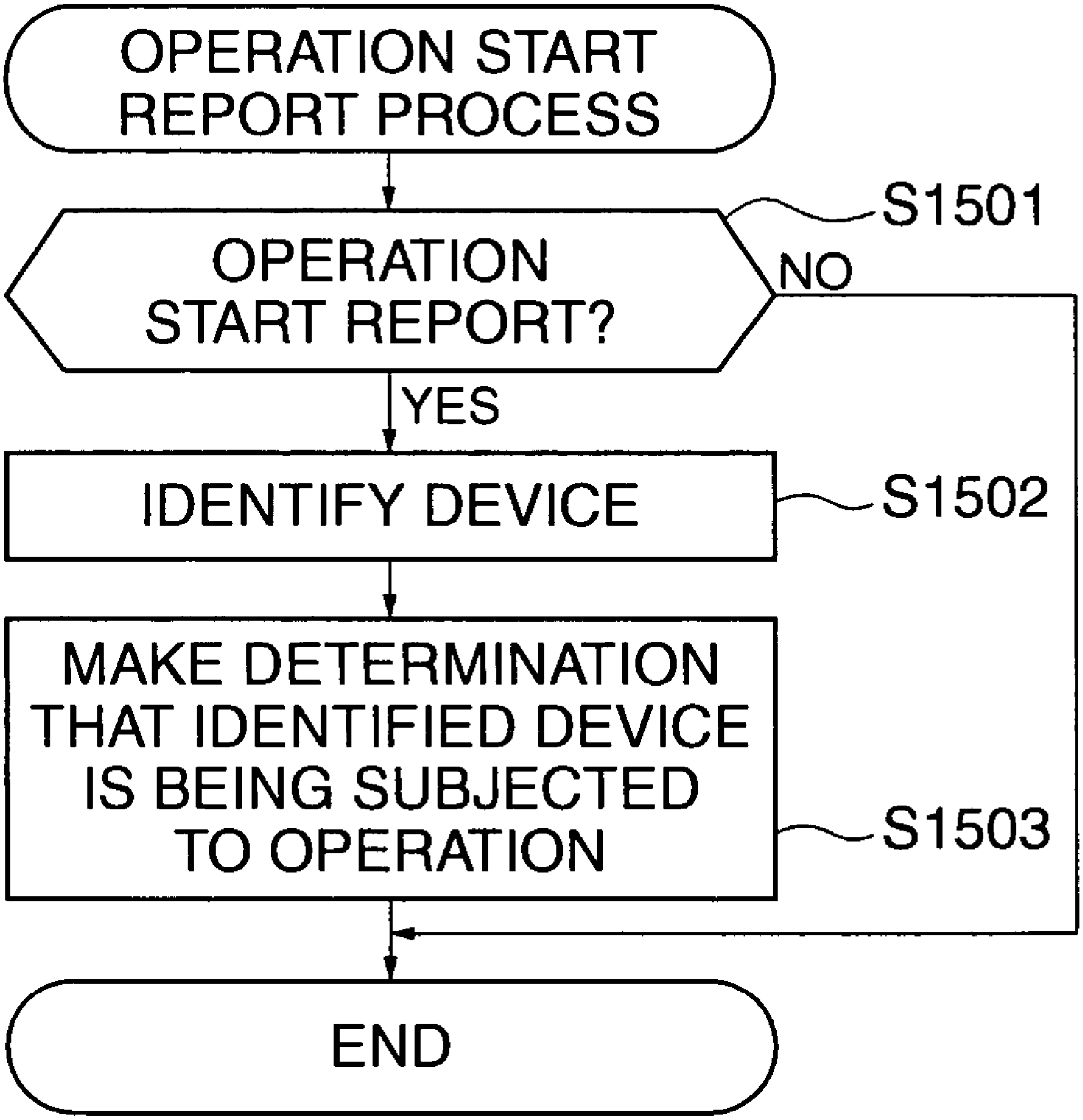
FIG. 17 is a flow chart showing an operation start report process carried out by the center side management server.

FIG. 17 is a flow chart showing an operation start report process carried out by the host 6. The operation start report process is started when the host 6 receives an operation start report from the monitoring apparatus 1 in the above described step S1402 in FIG. 16. The host 6 receives various mails such as a return mail returned in response to a counter information acquisition request, and a failure notification mail from the monitoring apparatus 1. In a step S1501, the host 6 carries out selection so that only an operation start report can be subjected to the present process. Only if it is determined in the step S1501 that an incoming report is an operation start report, steps S1502 to S1503 are executed.

In the step S1502, the host 6 identifies the device which is related to the operation start report from the monitoring apparatus 1. Then, in the step S1503, the host 6 sets the device identified in the step S1502 as a device being subjected to operation. In the present embodiment, in the step S1502, the counter information acquisition request from the host 6 described above with reference to FIG. 10 is temporarily stopped for the device. Also, failure notification described above with reference to FIG. 11, which is related to the device being subjected to operation, is ignored.

If the host 6 which receives an operation start report from the monitoring apparatus 1, the host 6 which acquires counter information, and the host 6 which receives failure notification are different, the monitoring apparatus 1 extracts information required for nullifying a counter information acquisition request and ignoring failure notification from an operation start report, and sends the extracted information to each host 6. Further, the monitoring apparatus 1 records the contents of the operation start report as a list of operations in the database 11.

Figure 18:
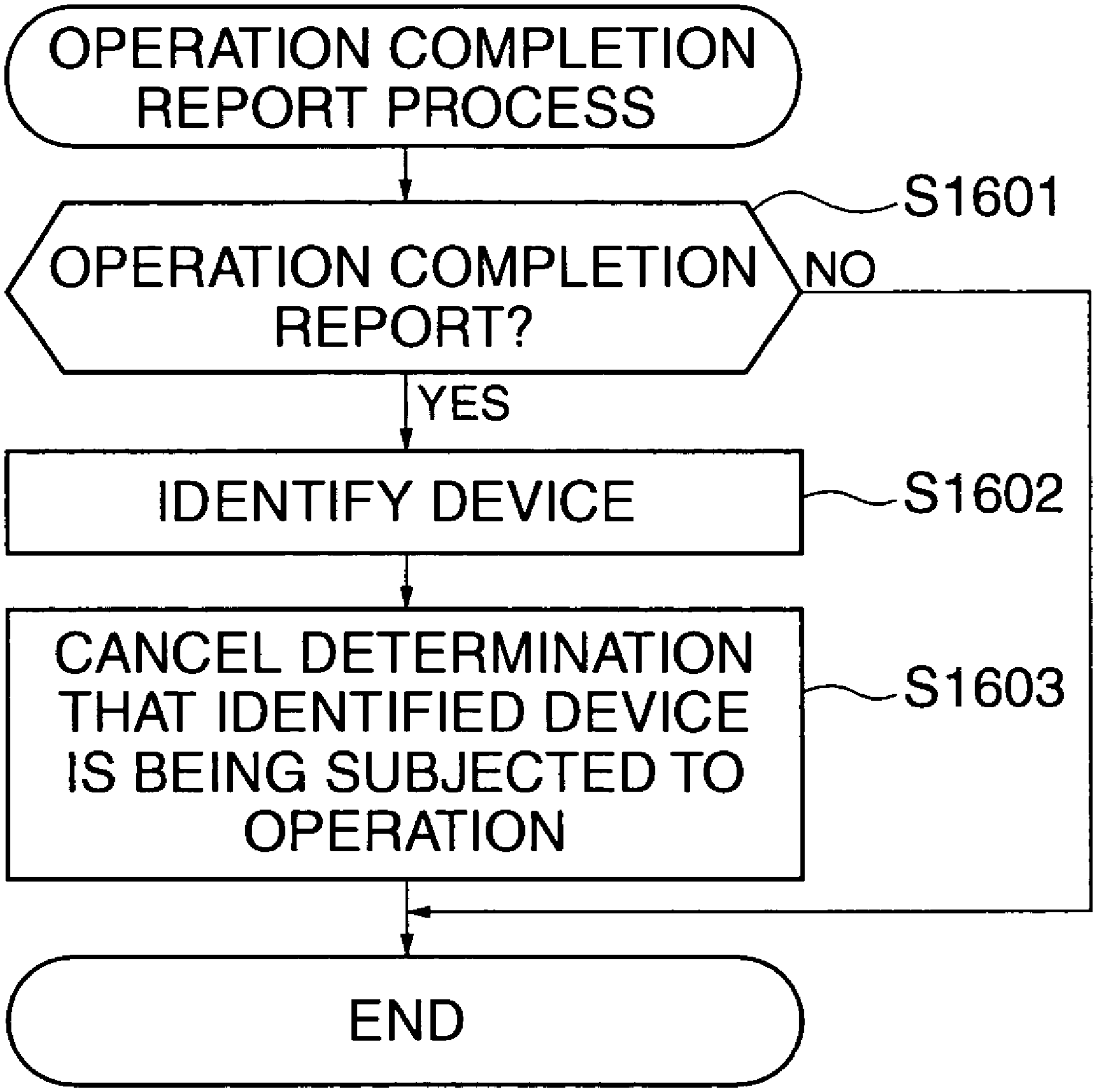
FIG. 18 is a flow chart showing an operation completion report process carried out by the center side management server.

FIG. 18 is a flow chart showing an operation completion report process carried out by the host 6. The operation completion report process is started when the host 6 receives an operation completion report from the monitoring apparatus 1 in the above described step S1404 in FIG. 16. The host 6 receives various mails such as a return mail returned in response to a counter information acquisition request, and a failure notification mail from the monitoring apparatus 1. In a step S1601, the host 6 carries out selection so that only an operation completion report will be subjected to the present processing program. Only if it is determined in the step S1501 that an incoming report is an operation completion report, steps S1602 to S1603 are executed.

In the step S1602, the host 6 identifies the device which is related to the operation completion report from the monitoring apparatus 1. Then, in the step S1603, the host 6 cancels setting of the device identified in the step S1602 as a device being subjected to operation. In the present embodiment, in the step S1602, the temporary stoppage of the counter information acquisition request from the host 6 described above with reference to FIG. 10 for the device is canceled. Also, failure notification described above with reference to FIG. 11, which is related to the device being subjected to operation, is ignored.

If the host 6 which receives an operation completion report from the monitoring apparatus 1, the host 6 which acquires counter information, and the host 6 which receives a failure notification are different, the monitoring apparatus 1 extracts information required for nullifying a counter information acquisition request and ignoring failure notification from an operation completion report, and sends the extracted information to each host 6. Further, the monitoring apparatus 1 records the contents of the operation completion report as a list of operations in association with the corresponding operation start report in the database 11.

It should be noted that in the failure notification, information to be accumulated in the database 11, such as sheet jam occurring in the device, as described above with reference to FIG. 11, should not necessarily be ignored in real time during operation, but information relating to operation being carried out may be subtracted when failure information accumulated in the database 11 is analyzed/counted, based on information accumulated in the steps S1503 in FIG. 17 and the step S1603 in FIG. 18.

By the processes in FIGS. 17 and 18, the host 18 receives an operation start report and an operation completion report by mail from the monitoring apparatus 1, and recognizes an operation time period for a specific device according to the operation start report and/or the operation completion report.

Figure 19:
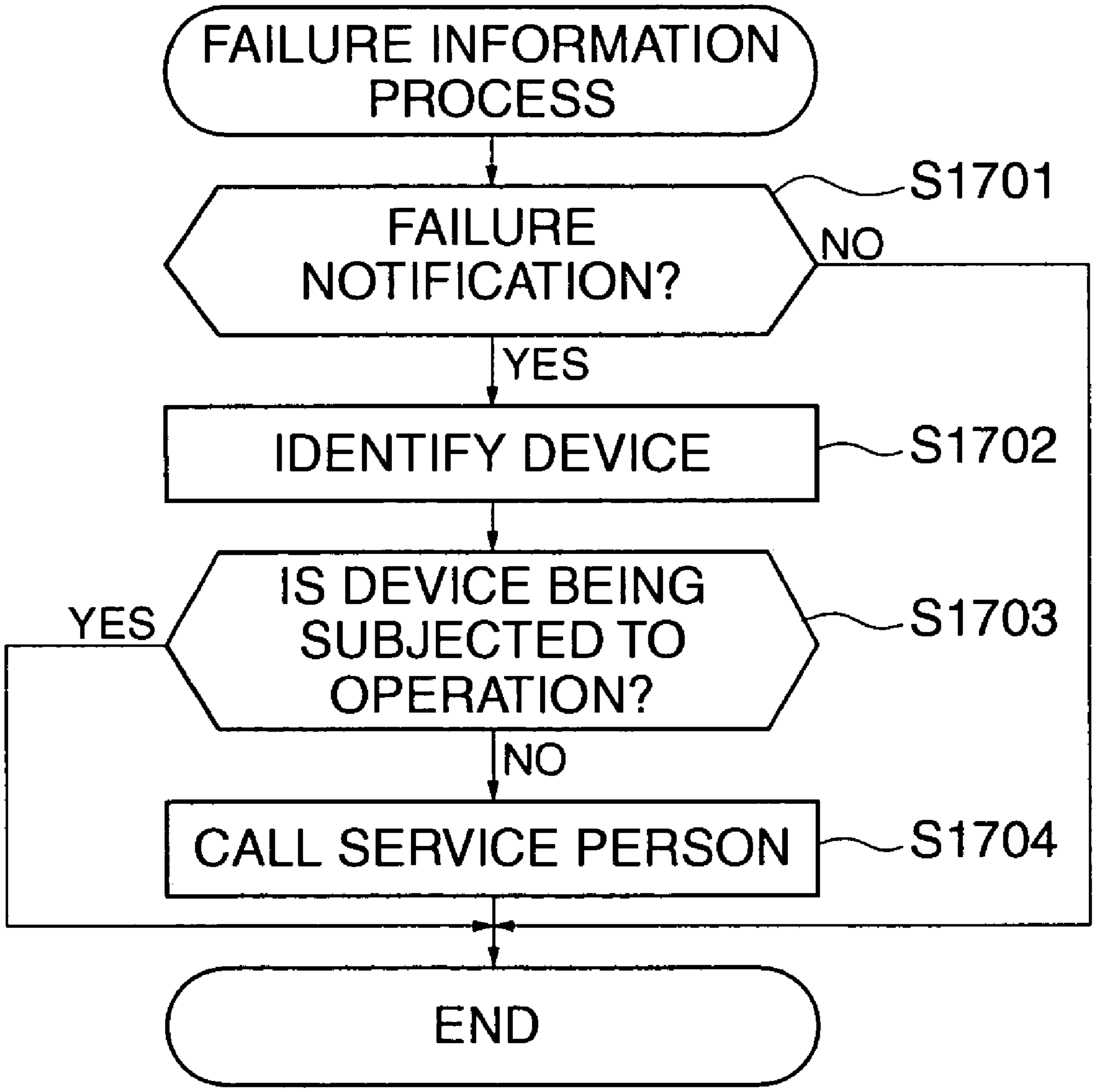
FIG. 19 is a flow chart showing a failure information process carried out by the center side management server.

FIG. 19 is a flow chart showing a failure information process carried out by the host 6. The failure information process is started when the host 6 receives a failure information notification mail from the monitoring apparatus 1. The flow chart of FIG. 19 assumes that a failure is limited to a service call. Only if it is determined in the step S1701 that a failure notification mail has been received, steps S1702 to S1703 are executed.

In the step S1702, the host 6 analyzes the failure notification mail to identify the device in which a failure is occurring. Then, in the step S1703, the host 6 determines whether the device is being subjected to operation or not according to the information accumulated in the step S1503 in FIG. 17. If it is determined in the step S1703 that the device is not is being subjected to operation, the process proceeds to a step S1704 wherein the service person is requested to come. If it is determined in the step S1703 that the device is being subjected to operation, the process is terminated with the failure notification being ignored.

As described above, according to the present embodiment, the monitoring apparatus 1 monitors a plurality of devices, and communicates with the devices by executing setting programs in the monitoring apparatus to acquire counter information from the devices, and also communicates with the host 6 (the center side management server 6) by mail, and when the service person completes the installation of the monitoring apparatus 1, the monitoring apparatus 1 generates an installation completion report including an operation ID which identifies an operation session, an operation item, operator information such as operator's name and telephone number, and installation completion date and time, and sends the generated installation completion report to the host 6 by mail. Therefore, the host 6 can be properly notified that the installation of the monitoring apparatus 1 has been completed. By the processes in FIGS. 15 and 16 carried out by the monitoring apparatus 1, it is possible to eliminate the problem that the above-mentioned report cannot be properly sent as in the prior art when settings of a communication system in a device are changed, e.g. when an IP (Internal Protocol) address is changed. Further, the monitoring apparatus 1, which is connected to a LAN where image forming apparatuses are installed such that the monitoring apparatus 1 can communicate with the external host 6, sends an operation start report and an operation completion report as described above, and hence even if a service person's PC cannot communicate with the external host 6 via the LAN, it is possible to surely send the reports.

Further, when a service person starts operation on a device being monitored by the monitoring apparatus 1, an installation start report including an ID which identifies an operation session, installation starting date and time, and information on the device subjected to operation is generated and sent to the host 6 by mail, and when the service person completes operation, an installation completion report including an ID which identifies an operation session, an operation item, operator information such as operator's name and telephone number, and installation completion date and time is generated and sent to the host 6 by mail. Therefore, even if the communication system of the device is not correctly configured, it is possible to properly send an operation start report and an operation completion report relating to the device to the host 6.

Further, the host 6 receives an installation completion report from the monitoring apparatus 1, identifies the monitoring apparatus 1 which has been completely installed according to the installation completion report, and starts a normal periodic process (periodic counter information acquisition process) for the monitoring apparatus 1. Therefore, the host 6 can recognize timing for starting the normal periodic process for the monitoring apparatus 1 being managed by the host 6.

Further, the host 6 can recognize an operation time period for a specific device according to an operation start report and an operation completion report sent by mail from the monitoring apparatus 1. Therefore, during the operation time period, it is possible to ignore information required for immediate response or to delete information relating to operation during the operation time period from the accumulated information.

Although in the above described embodiment, the device remote monitoring system is constructed as shown in FIG. 1, the present invention is not limited to this, but the numbers of monitoring apparatuses, center side management servers, terminal side management servers, devices, and so forth to be installed, the network arrangement, and the types of devices to be monitored may be arbitrarily set.

Further, it goes without saying that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a RAM, a floppy (registered trademark) disk, a hard disk, an optical disk, a magneto optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM. The program code may be downloaded via a network.

Further, it goes without saying that the functions of the above described embodiment may be accomplished not only by executing the program code read out by a computer, but also by causing an OS (operating system) or the like which operates on the computer to perform a part or all of the actual operations based on instructions of the program code.

Further, it goes without saying that the functions of the above described embodiment thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A monitoring apparatus capable of acquiring maintenance information from a plurality of image forming apparatuses to be monitored via a communication line, and capable of communicating with a management apparatus, comprising:

an acquiring device that acquires the maintenance information from the plurality of image forming apparatuses to be monitored; and a management device that carries out one of management of completion of installation of the monitoring apparatus and central management of completion of operations carried out for the plurality of image forming apparatuses to be monitored, wherein said management device comprises an installation completion report generating device that generates an installation completion report including information specifying the monitoring apparatus when installation of the monitoring apparatus is completed, and wherein the monitoring apparatus further comprises an installation completion report sending device that sends the generated installation completion report to the management apparatus.

2. A monitoring apparatus according to claim 1, wherein the maintenance information acquired from the image forming apparatuses includes information relating to consumable supplies used in the image forming apparatuses, and information relating to failure having occurred in the image forming apparatuses.

3. A monitoring apparatus capable of acquiring maintenance information from a plurality of image forming apparatuses to be monitored via a communication line, and capable of communicating with a management apparatus, comprising:

an acquiring device that acquires the maintenance information from the plurality of image forming apparatuses to be monitored;

a management device that carries out one of management of completion of installation of the monitoring apparatus and central management of completion of operations carried out for the plurality of image forming apparatuses to be monitored;

a selecting device that selects a predetermined image forming apparatus from among the plurality of image forming apparatuses;

an operation start report sending device that sends an operation start report relating to the image forming apparatus selected by said selecting device to the management apparatus; and an operation completion report sending device that sends an operation completion report relating to the image forming apparatus selected by said selecting device to the management apparatus.

4. A monitoring apparatus according to claim 3, further comprising an operating device that carries out operations for the selected image forming apparatus after the operation start report is sent; and wherein said operation completion report sending device generates the operation completion report including contents of the operations carried out by said operating device, and sends the generated operation completion report to the management apparatus.

5. A monitoring apparatus according to claim 4, wherein said operation completion report sending device generates the operation completion report including information identifying the monitoring apparatus.

6. A monitoring apparatus capable of acquiring maintenance information from a plurality of image forming apparatuses to be monitored via a communication line, and capable of communicating with a management apparatus, comprising:

an acquiring device that acquires the maintenance information from the plurality of image forming apparatuses to be monitored;

a management device that carries out one of management of completion of installation of the monitoring apparatus and central management of completion of operations carried out for the plurality of image forming apparatuses to be monitored;

an operation start report generating device operable when operation for an image forming apparatus selected from the plurality of image forming apparatuses to be subjected to operation are started, to generate an operation start report including information specifying the image forming apparatus subjected to the operation and information indicative of operation starting date and time;

an operation start report sending device that sends the operation start report to the management apparatus;

an operation completion report generating device that generates an operation completion report including information capable of being correlated with the operation start report and information indicative of operation completion date and time; and an operation completion report sending device that sends the operation completion report to the management apparatus.

7. A management apparatus capable of communicating with a monitoring apparatus that is capable of acquiring maintenance information from a plurality of image forming apparatuses to be monitored via a communication line, comprising:

an installation completion report receiving device that receives an installation completion report including information identifying the monitoring apparatus by electronic mail; and a normal periodic processing device that identifies the monitoring apparatus having been installed according to the received installation completion report, and carries out a normal periodic process for the identified monitoring apparatus.

8. A management apparatus according to claim 7, further comprising:

an operation start report receiving device that receives an operation start report including information identifying an image forming apparatus subjected to operation, and information indicative of operation starting date and time;

an operation completion report receiving device that receives an operation completion report including information capable of being correlated with the operation start report and information indicative of operation completion date and time; and an operation time period recognition device that recognizes an operation time period for which operation is carried out for the identified image forming apparatus according to at least one of the operation start report and the operation completion report.

9. A management apparatus according to claim 7, wherein the normal periodic process comprises a process in which the monitoring apparatus is periodically requested to send information acquired from the image forming apparatuses to be monitored by the monitoring apparatus.

10. A management apparatus according to claim 8, further comprising a nullification device operable upon receipt of the operation start report, to nullify a notification of counter information or failure relating to the image forming apparatus subjected to operation, sent from the monitoring apparatus.

* * * * *